US011193532B2

(12) United States Patent
Ito et al.

(10) Patent No.: US 11,193,532 B2
(45) Date of Patent: Dec. 7, 2021

(54) VARIABLE STIFFNESS BUSHING

(71) Applicant: HONDA MOTOR CO., LTD., Tokyo (JP)

(72) Inventors: Yuho Ito, Wako (JP); Toshio Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 75 days.

(21) Appl. No.: 16/787,928

(22) Filed: Feb. 11, 2020

(65) Prior Publication Data

US 2020/0263731 A1 Aug. 20, 2020

(30) Foreign Application Priority Data

Feb. 15, 2019 (JP) .............................. JP2019-025093

(51) Int. Cl.
*F16C 25/04* (2006.01)
*F16C 17/02* (2006.01)
(Continued)

(52) U.S. Cl.
CPC .............. *F16C 25/04* (2013.01); *F16C 17/02* (2013.01); *F16F 1/3807* (2013.01); *F16F 9/535* (2013.01); *F16F 2224/045* (2013.01)

(58) Field of Classification Search
CPC ........ F16F 1/3807; F16F 1/3615; F16F 1/387; F16F 1/361; F16F 9/535; F16F 9/53;
(Continued)

(56) References Cited

U.S. PATENT DOCUMENTS

| 4,909,489 A | * | 3/1990 | Doi | .......................... F16F 13/30 |
| | | | | 248/566 |
| 5,050,850 A | * | 9/1991 | Noguchi | ............. F16F 13/1427 |
| | | | | 267/140.12 |

(Continued)

FOREIGN PATENT DOCUMENTS

| CN | 101253347 A | 8/2008 |
| CN | 105987119 A | 10/2016 |

(Continued)

OTHER PUBLICATIONS

First Notification of Office Action for Application CN 202010086100.6 dated May 7, 2021; 22 pp.

*Primary Examiner* — Robert A. Siconolfi
*Assistant Examiner* — San M Aung
(74) *Attorney, Agent, or Firm* — Armstrong Teasdale LLP

(57) ABSTRACT

A variable stiffness bushing includes: inner and outer tubular members; an elastic member connecting these tubular members. At least one pair of circumferentially separated liquid chambers is defined in the elastic member such that first axial ends and second axial ends of the liquid chambers are defined by first and second end walls of the elastic member, respectively. The liquid chambers of each pair communicate with each other by a corresponding communication passage including a circumferential passage provided in one of the tubular members, which includes a coil wound coaxially therewith and a yoke provided with at least one gap constituting the circumferential passage. A magnetic fluid fills the liquid chambers and the communication passage(s). The first and second end walls are configured such that when the tubular members are axially displaced relative to each other, a difference is created between volumes of the liquid chambers of each pair.

8 Claims, 17 Drawing Sheets

(51) Int. Cl.
*F16F 1/38* (2006.01)
*F16F 9/53* (2006.01)

(58) Field of Classification Search
CPC .. F16F 9/3481; F16F 9/3485; F16F 2224/045; F16F 13/1463; F16F 13/28; F16F 13/107; F16F 13/305; F16F 2222/06; F16F 2228/066; F16F 1/145; F16C 17/02; F16C 25/04; F16C 27/02; F16C 27/063; F16C 2210/04; F16C 2210/06; F16C 2326/05; F16C 23/04
USPC .......................................................... 267/219
See application file for complete search history.

(56) References Cited

U.S. PATENT DOCUMENTS

| | | | |
|---|---|---|---|
| 5,165,668 A | 11/1992 | Gennesseaux | |
| 5,299,788 A * | 4/1994 | Kanda | F16F 13/14 267/140.12 |
| 8,807,543 B2 * | 8/2014 | Loheide | F16F 13/1418 267/140.12 |
| 2007/0273073 A1 * | 11/2007 | Siemer | F16F 13/28 267/140.14 |

FOREIGN PATENT DOCUMENTS

| | | |
|---|---|---|
| EP | 0784163 A1 | 7/1997 |
| EP | 1705400 A1 | 9/2006 |
| FR | 2812052 A1 | 1/2002 |
| JP | S63176844 A | 7/1988 |
| JP | H023721 A | 1/1990 |
| JP | H0642577 A | 2/1994 |
| JP | H0674288 A | 3/1994 |
| JP | H07158688 A | 6/1995 |
| JP | H07280024 A | 10/1995 |
| KR | 20030013719 A | 2/2003 |

* cited by examiner

*Fig.5*
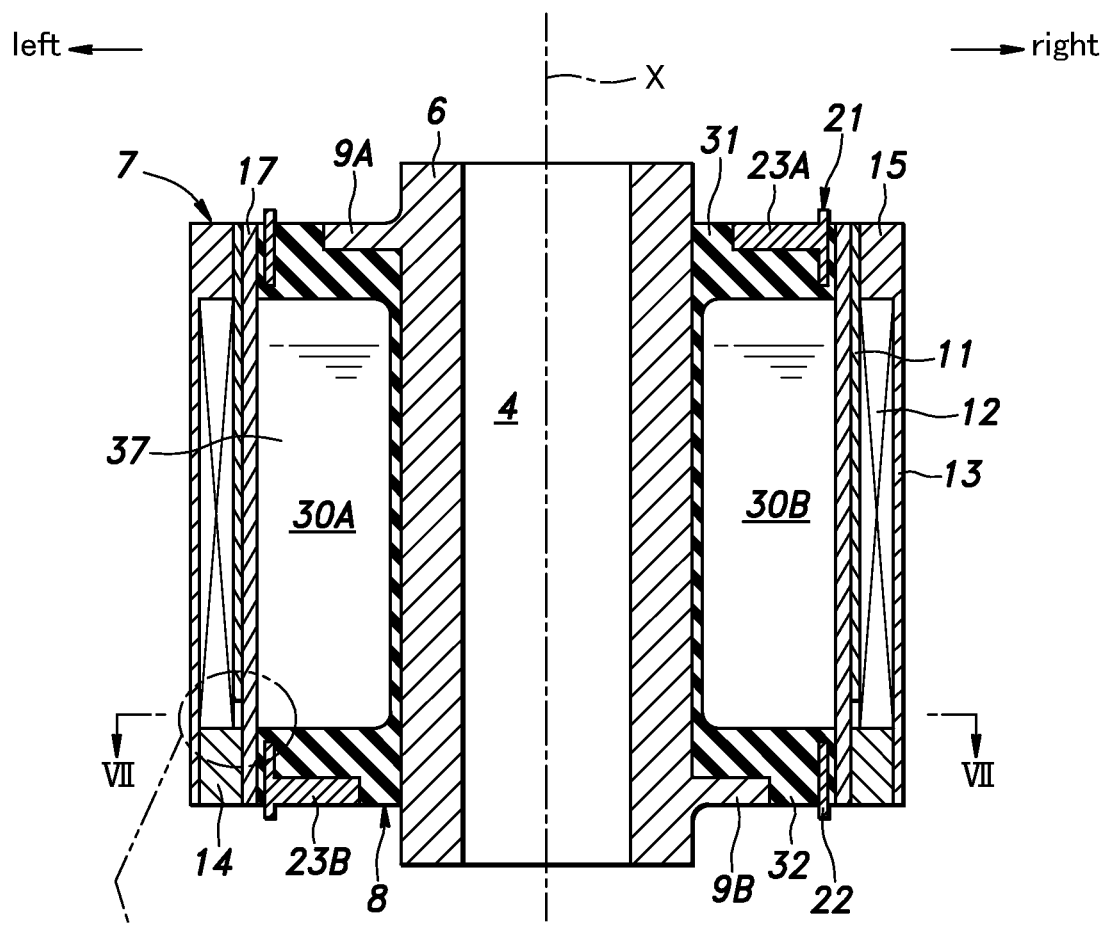
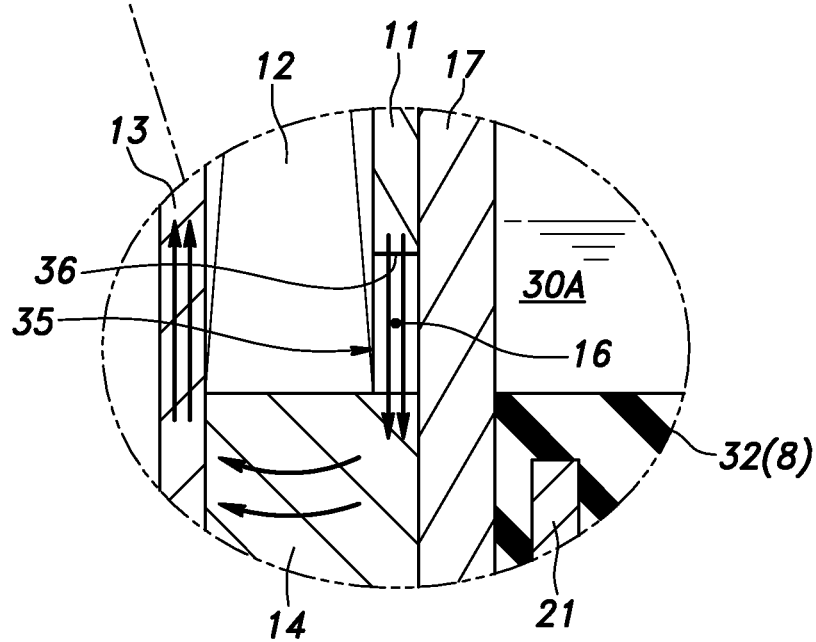

Fig.11
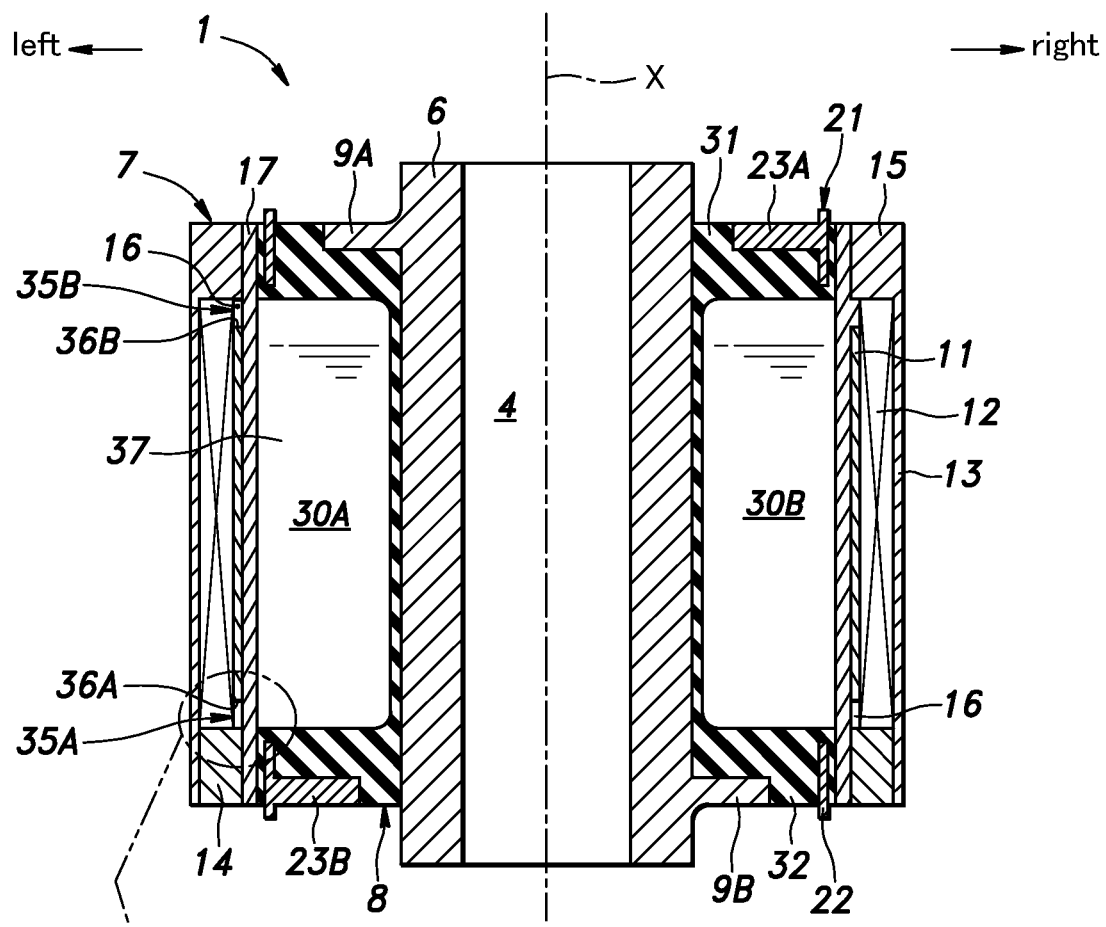
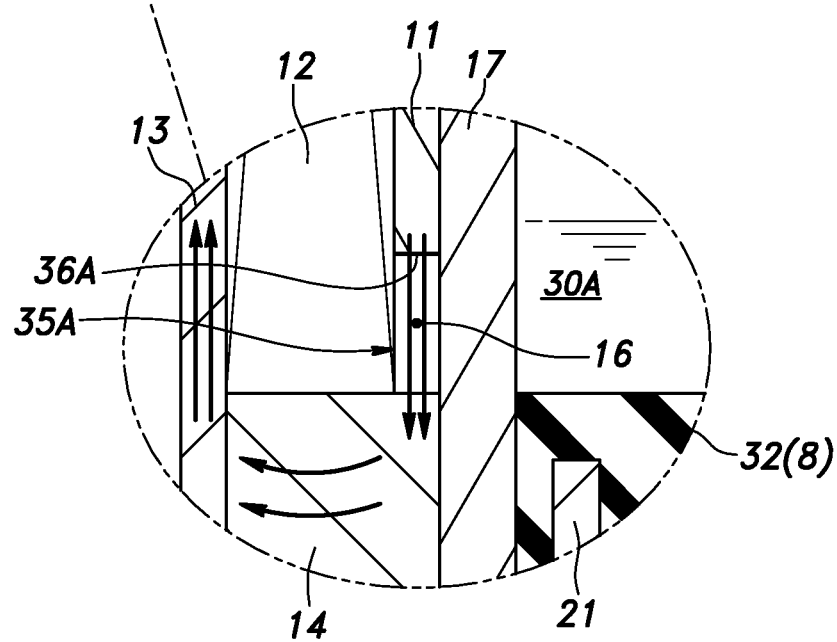

VARIABLE STIFFNESS BUSHING

TECHNICAL FIELD

The present invention relates to a variable stiffness bushing.

BACKGROUND ART

As a cylindrical liquid filled mount (bushing), there is known a liquid filled mount configured to damp vibrations not only in the direction orthogonal to the axial direction but also in directions other than the direction orthogonal to the axial direction, particularly in the tube axis direction, by using the flow resistance of the liquid (see JPH6-74288A, for example).

The liquid filled mount disclosed in JPH6-74288A includes an inner tubular member, an outer tubular member, an elastic member connecting the inner and outer tubular members, a pair of liquid chambers defined on respective sides of the inner tubular member with respect to the direction orthogonal to the tube axis, a filling liquid, an orifice communicating the liquid chambers with each other, through-cavities extending through the elastic member in the tube axis direction at positions on respective sides with respect to the direction orthogonal to the tube axis, and a stopper protruding from an intermediate position of the inner tubular member to both sides with respect to the direction orthogonal to the tube axis. The elastic member includes partition wall parts that separate the respective through-cavities from the corresponding liquid chambers, and each partition wall is integrally formed with a covering part covering a corresponding tip end of the stopper, which protrudes through the partition wall part toward the corresponding liquid chamber, in a non-bonded state, and a separating wall part separating the liquid chamber into two portions in the tube axis direction and protruding to a vicinity of the inner circumferential surface of the outer tubular member such that a gap is defined between the separating wall part and the inner circumferential surface. The absorption and damping of the vibrations in the tube axis direction are achieved owing to the flow resistance of the filling liquid that is forced to flow from one of the liquid chamber portions of each liquid chamber separated by the corresponding separating wall part in the tube axis direction to the other of the liquid chamber portions via the gap.

However, in the liquid filled bushing disclosed in JPH6-74288A, the vibration absorbing/damping characteristics (namely, stiffness of the liquid filled bushing) in the tube axis direction are determined by the size of the gap and the viscosity of the filling liquid. Also, the vibration absorbing/damping characteristics in the direction orthogonal to the tube axis are determined by the size of the orifice and the viscosity of the filling liquid. Namely, in this liquid filled bushing, the stiffness has a constant value determined in the designing stage and cannot be varied to a desired value during use.

SUMMARY OF THE INVENTION

In view of such background, a primary object of the present invention is to provide a variable stiffness bushing that is capable of varying the axial stiffness as desired with a simple configuration.

Means to Accomplish the Task

To achieve the above object, one embodiment of the present invention provides a variable stiffness bushing (1), comprising: an inner tubular member (6); an outer tubular member (7) disposed coaxially around the inner tubular member with a prescribed gap defined between the outer tubular member and the inner tubular member; a tubular elastic member (8) connecting the inner tubular member and the outer tubular member; at least one pair of liquid chambers (30) defined in the elastic member such that the liquid chambers are circumferentially separated from one another and first axial ends and second axial ends of the liquid chambers are defined by a first end wall (31) and a second end wall (32) of the elastic member, respectively; at least one communication passage (35) each including a circumferential passage (36) provided in one (7) of the inner tubular member and the outer tubular member and extending in a circumferential direction, each of the at least one communication passage communicating the liquid chambers of a corresponding pair of the at least one pair of liquid chambers with each other; a coil (12) wound coaxially with and provided in the one (7) of the inner tubular member and the outer tubular member; a yoke (11, 14) included in the one (7) of the inner tubular member and the outer tubular member and provided with at least one gap (16) each constituting the circumferential passage of a corresponding one of the at least one communication passage; and a magnetic fluid (37) filling the at least one pair of liquid chambers and the at least one communication passage, wherein the first end wall and the second end wall are configured such that when the inner tubular member and the outer tubular member are axially displaced relative to each other, a difference is created between volumes of the liquid chambers of each pair of the at least one pair of liquid chambers.

With this configuration, when the inner tubular member and the outer tubular member are axially displaced relative to each other, a difference is created between the volumes of the liquid chambers of each pair of the at least one pair of liquid chambers, and the magnetic fluid flows through the communication passage in accordance with the volume difference. At this time, by supplying electric current to the coil to generate a magnetic field around the coil such that magnetic field lines pass through the circumferential passage of each communication passage, the flow resistance of the magnetic fluid in the communication passage can be varied. Thus, the axial stiffness (stiffness against the axial displacement between the inner tubular member and the outer tubular member) and damping characteristics of the variable stiffness bushing can be varied as desired by controlling the electric current supplied to the coil. In addition, the stiffness and damping characteristics of the variable stiffness bushing can be varied with a simple configuration in that the circumferential passage, the coil, and the yoke are provided in one of the inner tubular member and the outer tubular member.

Preferably, a part of the first end wall (31) defining the first axial end of one liquid chamber (30A) of each pair of the at least one pair of liquid chambers has a first high bending stiffness portion (9A) on a side of the inner tubular member (6), a part of the second end wall (32) defining the second axial end of the one liquid chamber of each pair of the at least one pair of liquid chambers has a second high bending stiffness portion (23B) on a side of the outer tubular member (7), a part of the first end wall (31) defining the first axial end of another liquid chamber (30B) of the each pair of the at least one pair of liquid chambers has a third high bending stiffness portion (23A) on a side of the outer tubular member, and a part of the second end wall (32) defining the second axial end of the other liquid chamber of each pair of the at least one pair of liquid chambers has a fourth high bending stiffness portion (9B) on a side of the inner tubular member.

Thereby, with a simple configuration in that the first and third high bending stiffness portions are provided in prescribed parts of the first end wall of the elastic member, and the second and fourth high bending stiffness portions are provided in prescribed parts of the second end wall of the elastic member, it is possible to create a volume difference between the liquid chambers of each pair in accordance with the axial displacement between the inner tubular member and the outer tubular member. Further, since the first to fourth high bending stiffness portions are provided in parts of the first end wall and the second end wall of the elastic member on the side of the inner tubular member or the outer tubular member, radial displacement between the inner tubular member and the outer tubular member is allowed.

Preferably, the first to fourth high bending stiffness portions each include a reinforcement plate (9, 23) provided in the first end wall or the second end wall associated therewith.

With this configuration, the stiffness of the high bending stiffness portions can be increased owing to the stiffness of the reinforcement plate without need to considerably increase the thickness of the high bending stiffness portions.

Preferably, the reinforcement plate (23) of each high bending stiffness portion provided on the side of the one (7) of the inner tubular member (6) and the outer tubular member (7) is at least partially embedded in the first end wall (31) or the second end wall (32) associated therewith and is not in contact with the yoke (11, 14).

With this configuration, the magnetic field lines flowing through the yoke are prevented from being dispersed to the reinforcement plates, and this allows the magnetic field lines flowing through the yoke to be concentrated in the circumferential passage(s) more reliably.

Preferably, the reinforcement plate (9) of each high bending stiffness portion provided on the side of the other (6) of the inner tubular member (6) and the outer tubular member (7) is formed integrally with the other of the inner tubular member and the outer tubular member.

Thereby, the high bending stiffness portions provided on the other of the inner tubular member and the outer tubular member can be embodied with a simple configuration without increasing the number of components.

Preferably, the variable stiffness bushing further comprises a tubular passage forming member (17) made of a non-magnetic material and provided on the one (7) of the inner tubular member (6) and the outer tubular member (7), the tubular passage forming member being positioned between the yoke (11, 14) and the elastic member (8) such that the circumferential passage (36) of each communication passage (35) is defined between the tubular passage forming member and the coil (12), and the tubular passage forming member is formed with at least one pair of communication holes (19), each pair of the at least one pair of communication holes communicating the circumferential passage of a corresponding one of the at least one communication passage with a corresponding pair of the at least one pair of liquid chambers (30).

With this configuration, the tubular passage forming member prevents the cross-sectional area of the circumferential passage from changing depending on the fluid pressure, whereby it is ensured that the magnetic fluid of an amount corresponding to the volume difference created between the liquid chambers of each pair of the at least one pair of liquid chambers flows through the corresponding circumferential passage. Thereby, the axial stiffness of the variable stiffness bushing can be varied accurately by controlling the electric current supplied to the coil to vary the flow resistance of the magnetic fluid in the circumferential passage.

Preferably, the at least one pair of liquid chambers (30) comprises a first pair of liquid chambers (30A, 30B) and a second pair of liquid chambers (30C, 30D), the liquid chambers of each pair are circumferentially spaced from each other by a predetermined distance so as to oppose each other with the inner tubular member (6) interposed therebetween, and the at least one communication passage (35) includes a first communication passage (35A) communicating the liquid chambers of the first pair of liquid chambers with each other and a second communication passage (35B) communicating the liquid chambers of the second pair of liquid chambers with each other.

With this configuration, when inner tubular member and the outer tubular member are displaced relative to each other in an opposing direction of the first pair of liquid chambers or an opposing direction of the second pair of liquid chambers, a volume difference is created between the two liquid chambers opposing in that direction, and the magnetic fluid of an amount corresponding to the created volume difference flows through the first communication passage or the second communication passage. Thus, the radial stiffness (stiffness against the radial displacement between the inner tubular member and the outer tubular member) and damping characteristics of the variable stiffness bushing can be varied as desired by controlling the electric current supplied to the coil.

Preferably, the circumferential passage (36A) of the first communication passage (35A) is formed at a position corresponding to one side of the coil (12) with respect to an axial direction, and the circumferential passage (36B) of the second communication passage (35B) is formed at a position corresponding to another side of the coil with respect to the axial direction.

With this configuration, the circumferential passage of the first communication passage and the circumferential passage of the second communication passage can be arranged such that they are spaced apart from each other but are both close to the coil such that the magnetic field generated by the coil can be concentrated in each of these circumferential passages effectively.

Preferably, the coil (12) is constituted of a first coil (12A) and a second coil (12B) arranged to be spaced from each other in the axial direction, the circumferential passage (36A) of the first communication passage (35A) being provided at a position corresponding to the first coil in the axial direction and the circumferential passage (36B) of the second communication passage (35B) being provided at a position corresponding to the second coil in the axial direction.

With this configuration, it is possible to individually vary the flow resistance in each of the circumferential passage of the first communication passage and the circumferential passage of the second communication passage by individually controlling the electric current supplied to each of the first coil and the second coil. Therefore, when the inner tubular member and the outer tubular member are displaced relative to each other in the radial direction, the stiffness of the variable stiffness bushing can be varied in the opposing direction of the first pair of liquid chambers and in the opposing direction of the second pair of liquid chambers independently.

Thus, according to an embodiment of the present invention, it is possible to provide a variable stiffness bushing that is capable of varying the axial stiffness as desired with a simple configuration.

BRIEF DESCRIPTION OF THE DRAWINGS

FIG. 5 is a sectional view taken along line V-V in FIG. 4;

FIG. 11 is a sectional view taken along line XI-XI in FIG. 9;

DESCRIPTION OF THE PREFERRED EMBODIMENT(S)

In the following, embodiments of the present invention will be described in detail with reference to the drawings.

First Embodiment

Figure 1:
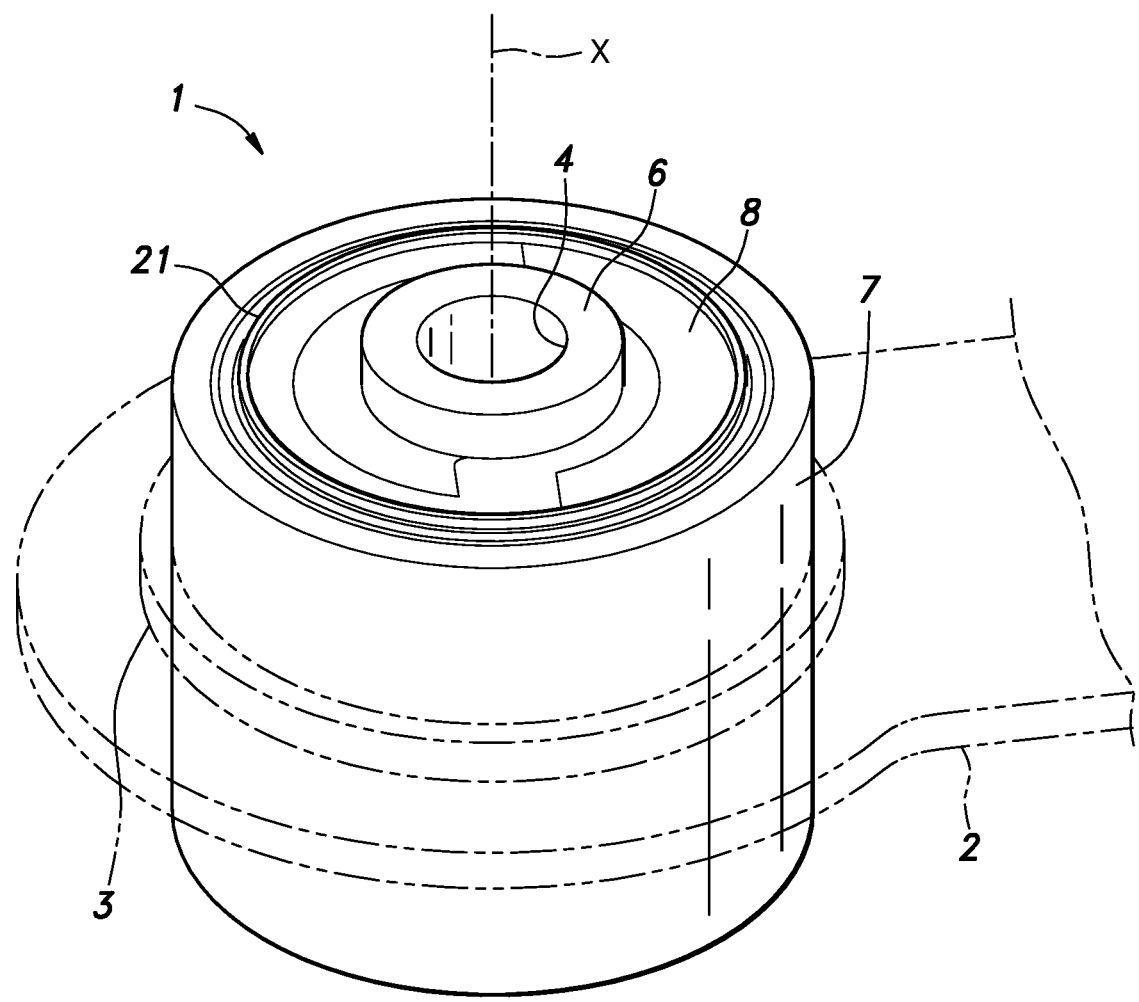
FIG. 1 is a perspective view showing a variable stiffness bushing according to the first embodiment of the invention.

First, with reference to FIGS. 1 to 8, a variable stiffness bushing 1 according to the first embodiment of the present invention will be described. As shown in FIG. 1, the variable stiffness bushing 1 is provided in a lower arm 2 of an automotive suspension 101 (see FIG. 16). Specifically, an outboard end of the lower arm 2 is provided with a cylindrical collar 3, and the variable stiffness bushing 1 having a cylindrical shape is coaxially fitted in the collar 3. The variable stiffness bushing 1 is formed with an inner bore (hereinafter referred to as a bolt insertion hole 4) extending along an axis X thereof. A bolt is inserted in the bolt insertion hole 4 and is fastened to a through-hole formed in a support wall. Thereby, the lower arm 2 is pivotally connected to a vehicle body 112 (see FIG. 17), a trailing arm 103 (see FIG. 16) or the like via the variable stiffness bushing 1.

In the following, the variable stiffness bushing 1 will be described in detail. In the following description, the vertical direction is defined as the direction of the axis X of the variable stiffness bushing 1 (namely, the direction of extension of the bolt insertion hole 4). It is to be noted, however, that such reference of the direction does not limit the arrangement of the variable stiffness bushing 1.

Figure 2:
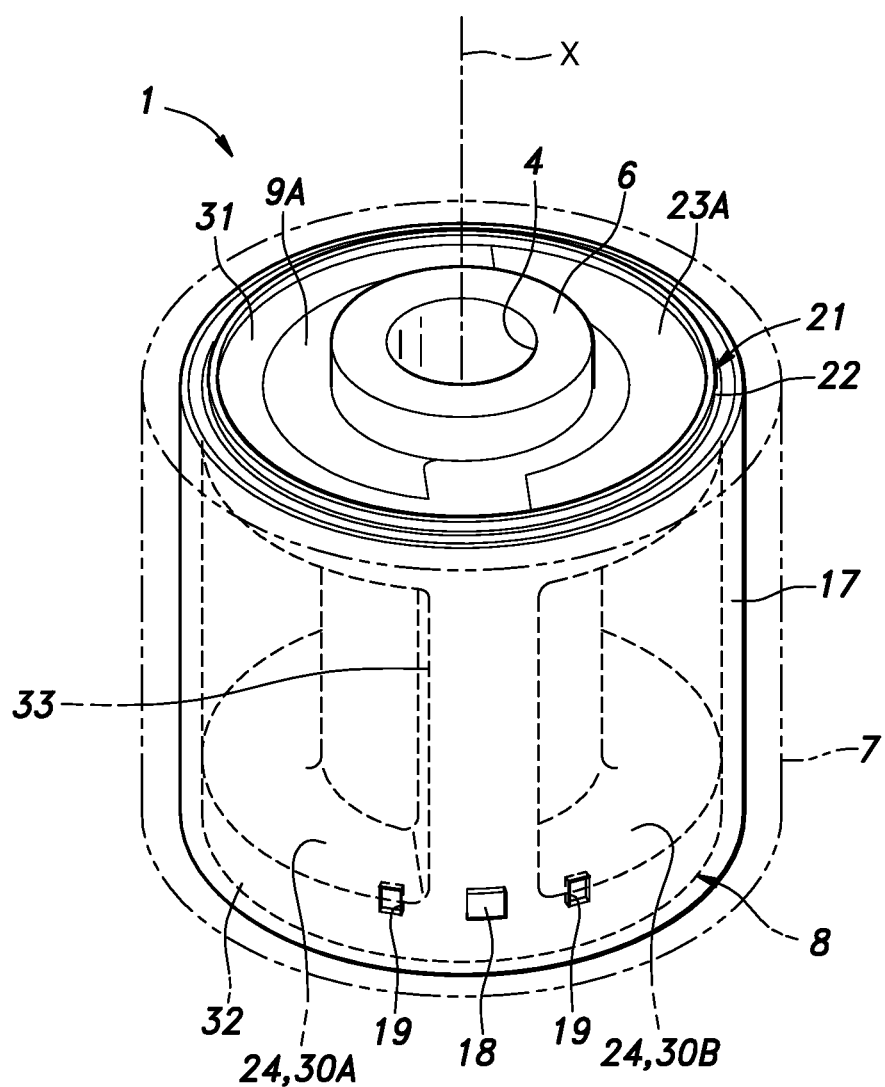
FIG. 2 is a partially transparent perspective view of the variable stiffness bushing shown in FIG. 1.
Figure 3:
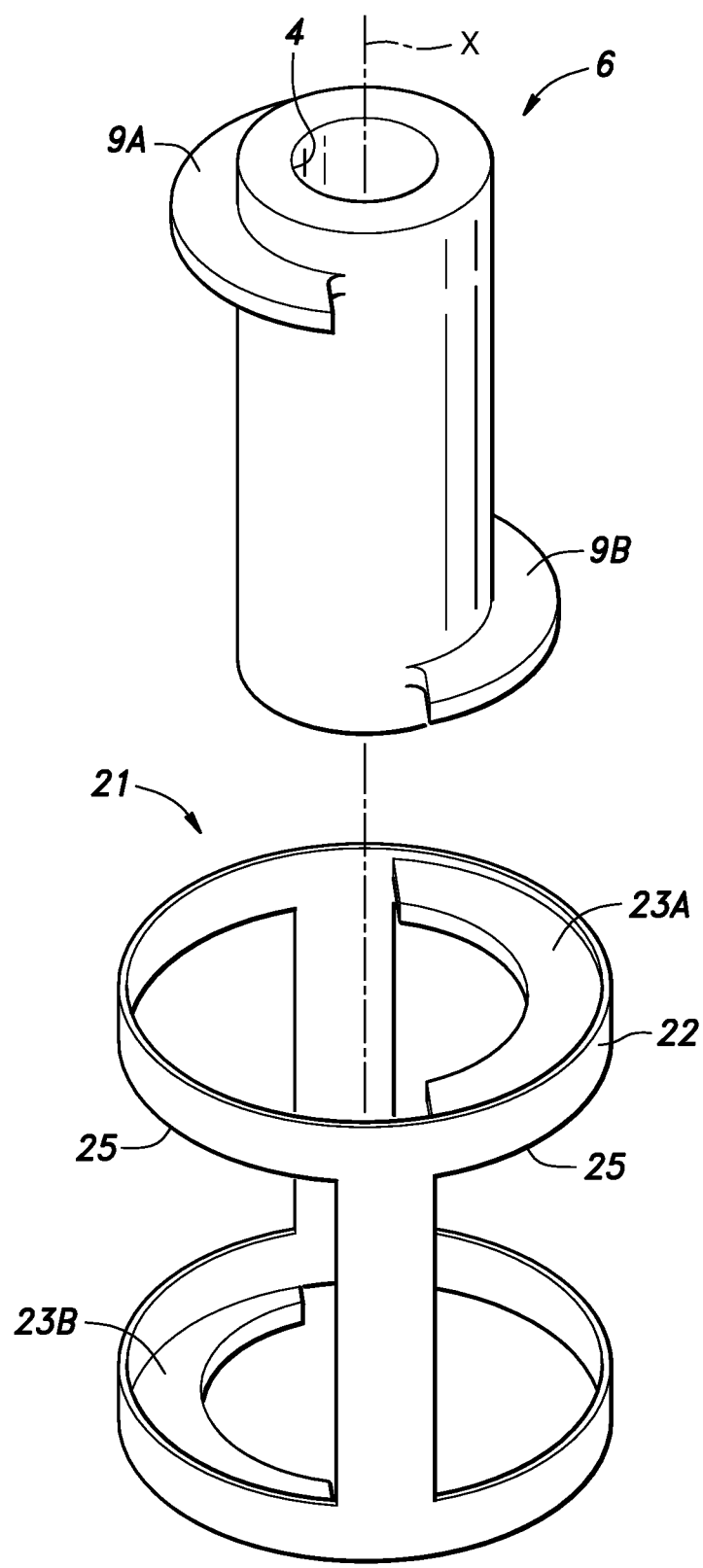
FIG. 3 is an exploded perspective view of a part of the variable stiffness bushing shown in FIG. 1.
Figure 4:
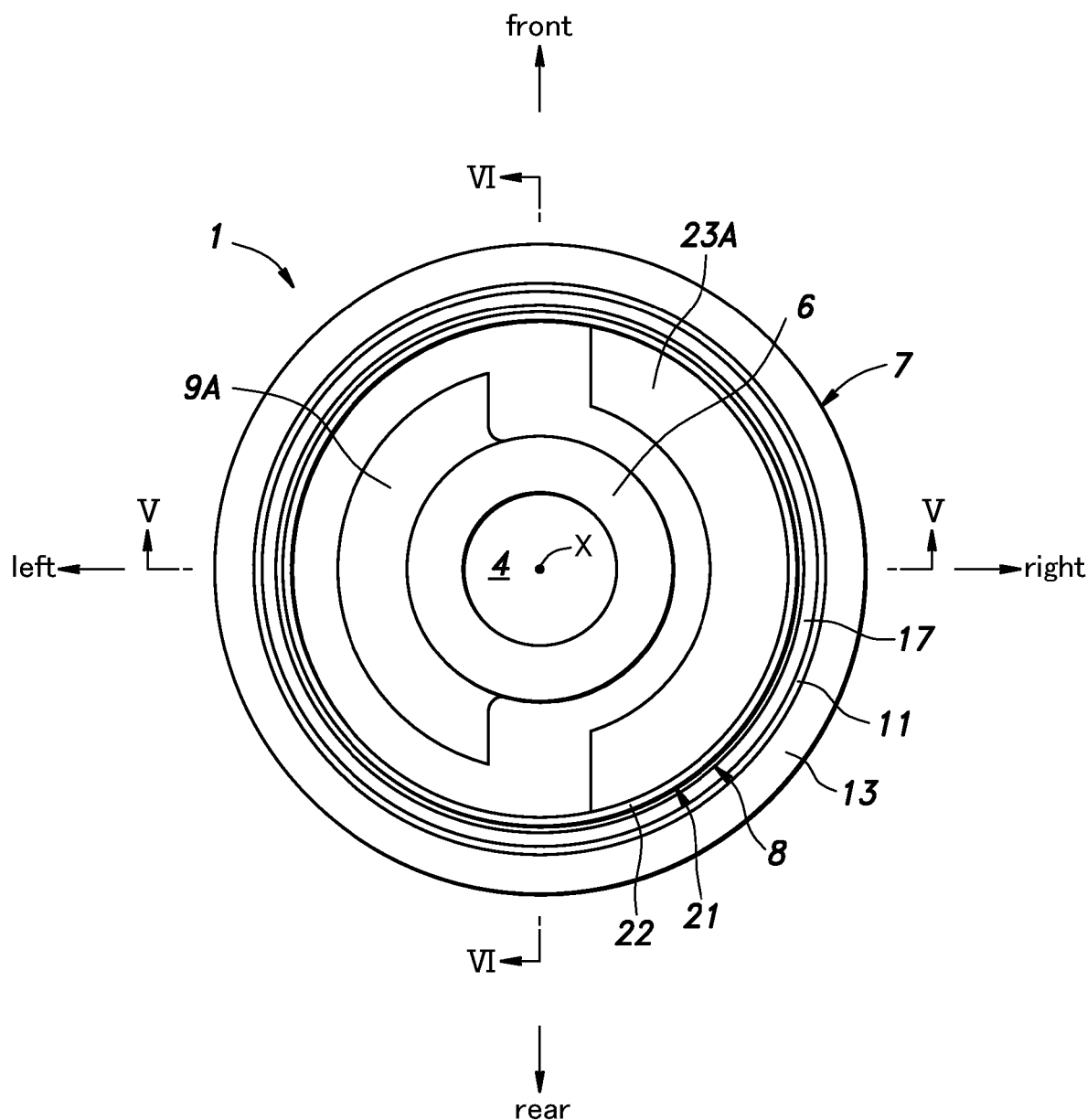
FIG. 4 is a plan view of the variable stiffness bushing shown in FIG. 1.
Figure 6:
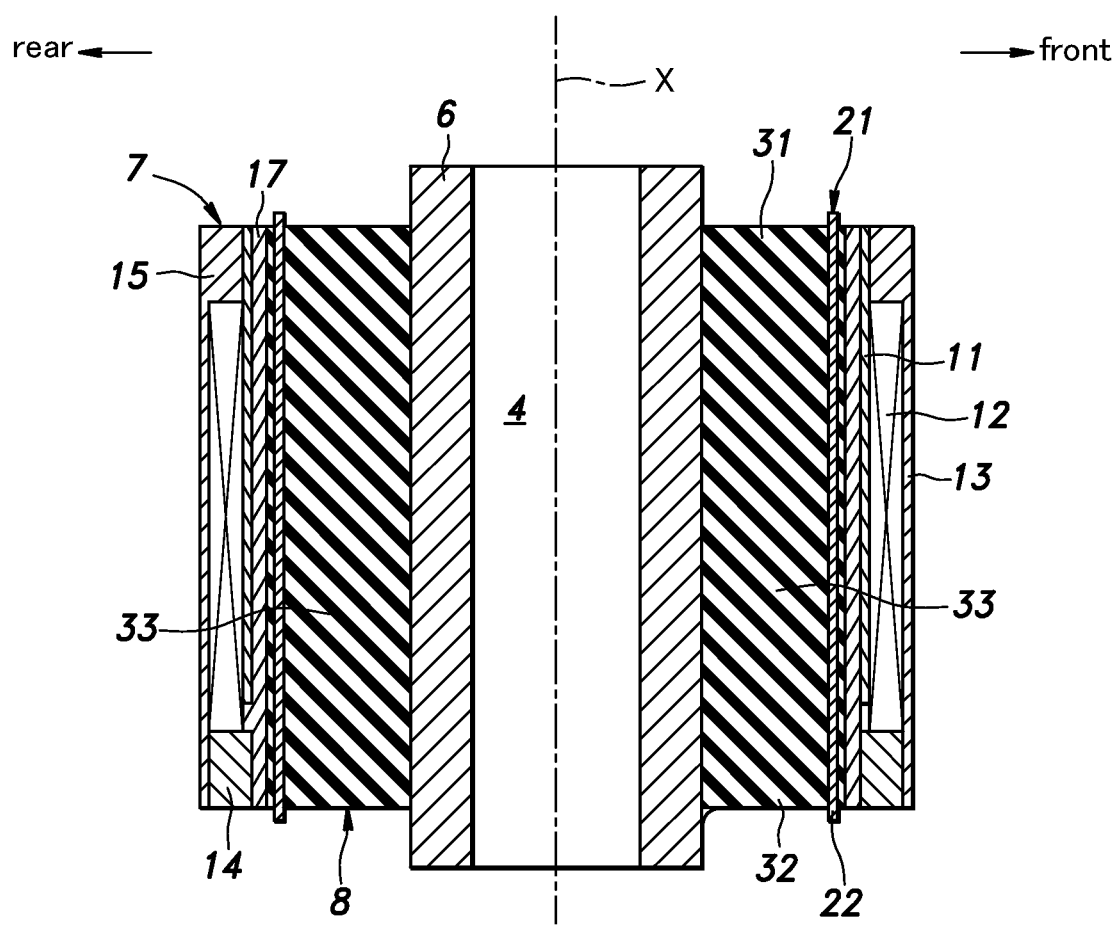
FIG. 6 is a sectional view taken along line VI-VI in FIG. 4.

FIG. 2 is a partially transparent perspective view of the variable stiffness bushing 1, FIG. 3 is an exploded perspective view of a part of the variable stiffness bushing 1, FIG. 4 is a plan view of the variable stiffness bushing 1, and FIGS. 5 and 6 are sectional views taken along line V-V and line VI-VI in FIG. 4, respectively. As shown in FIGS. 2 to 6, the variable stiffness bushing 1 includes an inner tubular member 6 defining the bolt insertion hole 4, an outer tubular member 7 disposed coaxially around the inner tubular member 6 with a prescribed gap defined between the inner tubular member 6 and the outer tubular member 7, and an elastic member 8 interposed between the inner tubular member 6 and the outer tubular member 7 and connecting the inner tubular member 6 and the outer tubular member 7. The elastic member 8 has a substantially cylindrical shape.

The inner tubular member 6 has a cylindrical shape arranged along the axis X extending in the vertical direction and includes a pair of arc-shaped outer flange portions 9 (9A, 9B) projecting radially outward near upper and lower end portions. The upper outer flange portion 9 (hereinafter, the upper outer flange portion 9A) and the lower outer flange portion 9 (hereinafter, the lower outer flange portion 9B) are circumferentially arranged at positions opposing each other via the axis X (at positions circumferentially apart from each other by 180 degrees) and are each formed integrally with the inner tubular member 6. The inner tubular member 6 is made of a material having high stiffness, such as a metal. The inner tubular member 6 may be made to contain a metal having a high permeability, such as iron or cobalt, or may be made to contain a metal having a low permeability, such as aluminum.

The outer tubular member 7 includes a cylindrical inner yoke 11 disposed along the axis X, a coil 12 coaxially wound around the inner yoke 11, an outer yoke 13 surrounding the coil 12, and a short, tubular lower yoke 14 joined to a lower end of the outer yoke 13. The outer yoke 13 is joined to an upper end of the inner yoke 11 above the coil 12 and is joined to the lower yoke 14 at a position below the coil 12.

The inner yoke 11, the outer yoke 13, and the lower yoke 14 are members made of a material having a high permeability, and preferably contain a metal that exhibits ferromagnetic properties, such as iron or cobalt. In the present embodiment, the inner yoke 11, the outer yoke 13, and the lower yoke 14 are made of iron.

The inner yoke 11 has a cylindrical shape arranged along the axis X and specifically is in the form of a single-tube pipe having a constant wall thickness and diameter. The outer yoke 13 has a cylindrical shape arranged along the axis X and is provided with an annular flange part 15 at an upper end thereof. The flange part 15 projects radially inward at the upper end portion of the outer yoke 13 to contact the inner yoke 11. Namely, the flange part 15 has an inner diameter substantially the same as the outer diameter of the inner yoke 11 and is contact with the inner yoke 11 to form an upper yoke. The lower yoke 14 has an outer diameter substantially the same as the inner diameter of the outer yoke 13 and is in contact with the inner circumferential surface of the outer yoke 13 at the lower end of the outer yoke 13. The lower yoke 14 has an inner diameter substantially the same as the outer diameter of the inner yoke 11. A cylindrical space is defined between the outer circumferential surface of the inner yoke 11 and the inner circumferential surface of an axially intermediate part of the outer yoke 13, and the coil 12 is disposed in this space.

The coil 12 is a member formed by winding a coated copper wire into a coil form and encapsulating the wound copper wire in resin in a cylindrical shape, with end portions of the copper wire being drawn out as lead wires. The coil 12 has an inner diameter same as the outer diameter of the inner yoke 11 and an outer diameter same as the inner diameter of the axially intermediate part of the outer yoke 13. Though not shown in the drawings, an inner circumferential surface of the flange part 15 is formed with an axially extending groove such that the lead wires of the coil 12 can be drawn out from an axial end surface of the outer yoke 13 through the groove.

The top surface of the lower yoke 14 is aligned with the lower end of the coil 12. The bottom surface of the inner yoke 11 is positioned slightly above the lower end of the coil 12. The lower end of the inner yoke 11 opposes the top surface of the lower yoke 14 via a gap at the lower end of the coil 12 so that an annular gap serving as a magnetic gap 16 is formed on an inner side of the coil 12.

On the inner side of the outer tubular member 7 (namely, on the inner side of the inner yoke 11 and the lower yoke 14) is provided a passage forming member 17 that closes the magnetic gap 16 from inside to define a circumferential passage 36 between the passage forming member 17 and the coil 12. The passage forming member 17 is a tubular member made of a non-magnetic material, more specifically, a non-magnetic material having a permeability lower than that of the metal constituting the inner yoke 11, and is joined to the outer tubular member 7. The passage forming member 17 is preferably made of synthetic resin or aluminum, for example.

As shown in FIG. 2, the outer circumferential surface of the passage forming member 17 is integrally formed with a projection 18 projecting into the magnetic gap 16 to interrupt the circumferential continuity of the magnetic gap 16. Further, two communication holes 19 are formed in the passage forming member 17 at positions near the respective circumferential sides of the projection 18 such that each communication hole 19 passes through the thickness of the passage forming member 17 and opens to the magnetic gap 16.

The elastic member 8 is made of an elastic material such as an elastomer (or rubber) and is fitted into the space between the passage forming member 17 and the inner tubular member 6. Further, a cylindrical reinforcement member 21 (FIG. 3) is embedded in the elastic member 8 in a coaxial manner. More specifically, the elastic member 8 is formed integrally with the inner tubular member 6 and the reinforcement member 21 by pouring unvulcanized rubber into a mold in which the inner tubular member 6 and the reinforcement member 21 are arranged at prescribed positions and then vulcanizing the rubber. The reinforcement member 21 is not exposed on the outer circumferential surface of the elastic member 8. The elastic member 8 is fitted in the passage forming member 17 and the outer peripheral portion thereof is joined to the passage forming member 17. The outer diameter of the elastic member 8 is slightly larger than the outer diameter of the reinforcement member 21. The outer diameter of the elastic member 8 is also slightly larger than the inner diameter of the passage forming member 17 before the elastic member 8 is fitted in the passage forming member 17. Thus, in the assembled state, the outer peripheral portion of the elastic member 8 is in close contact with the inner circumferential surface of the passage forming member 17, and the reinforcement member 21 is not in contact with the passage forming member 17 nor the outer tubular member 7.

The reinforcement member 21 is a rigid member made of a non-magnetic material (preferably, a non-magnetic metal) having a permeability lower than that of the metal constituting the inner yoke 11 and serves to maintain the shape of the outer circumferential surface of the elastic member 8. The reinforcement member 21 is preferably made of aluminum, for example.

As shown in FIG. 3, the reinforcement member 21 is a cage-like member including a cylindrical tubular portion 22 disposed along the axis X and a pair of arc-shaped inner flange portions 23 (23A, 23B) projecting radially inward at either axial end of the tubular portion 22. More specifically, the tubular portion 22 includes upper and lower ring-shaped parts that are connected by a pair of vertically extending bars, and the inner flange portions 23 are provided on the inner sides of the respective ring-shaped parts. The upper inner flange portion 23 (hereinafter, the upper inner flange portion 23A) and the lower inner flange portion 23 (hereinafter, the lower inner flange portion 23B) are circumferentially arranged at positions opposing each other via the axis X (at positions circumferentially apart from each other by 180 degrees) and are each formed integrally with the tubular portion 22. The upper inner flange portion 23A is arranged at a position circumferentially aligned with the lower outer flange portion 9B. The lower inner flange portion 23B is arranged at a position circumferentially aligned with the upper outer flange portion 9A. In the present embodiment, a large part of the reinforcement member 21 except for the upper end and the lower end of the tubular portion 22 is embedded in the elastic member 8 though in another embodiment, the entirety of the reinforcement member 21 may be embedded in the elastic member 8.

The outer circumferential surface of the elastic member 8 is formed with two recesses 24 (see FIGS. 2 and 5) arranged in the circumferential direction to form respective liquid chambers 30 (30A, 30B) (see FIG. 7) in cooperation with the passage forming member 17. Namely, the elastic member 8 forms two liquid chambers 30 between the passage forming member 17 and the inner tubular member 6. Thus, the elastic member 8 includes an upper end wall 31 provided at an upper end thereof to define the upper ends of the two liquid chambers 30 and a lower end wall 32 provided at a lower end thereof to define the lower ends of the two liquid chambers 30.

Figure 7:
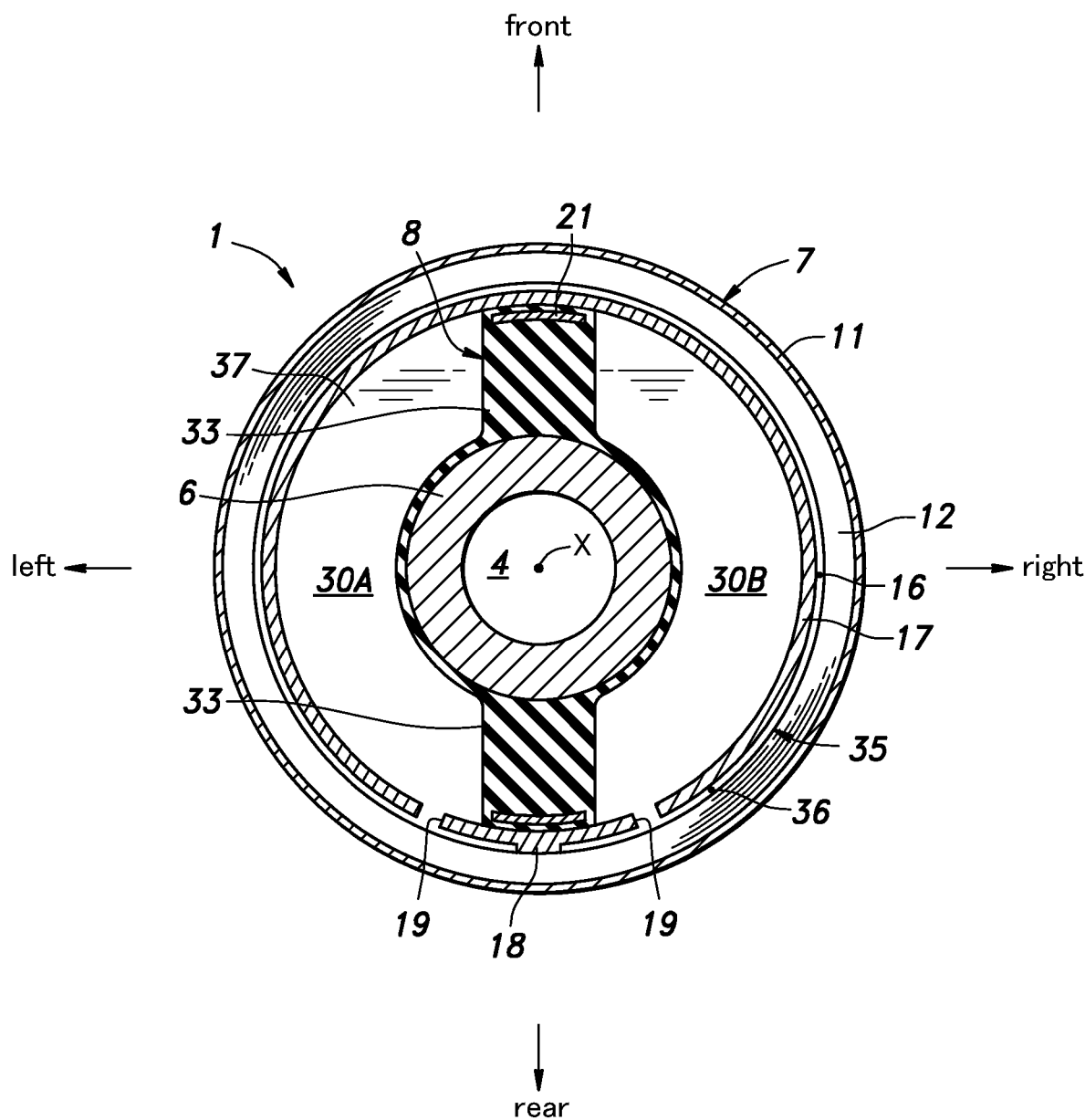
FIG. 7 is a sectional view taken along line VII-VII in FIG. 5.
Figure 8:
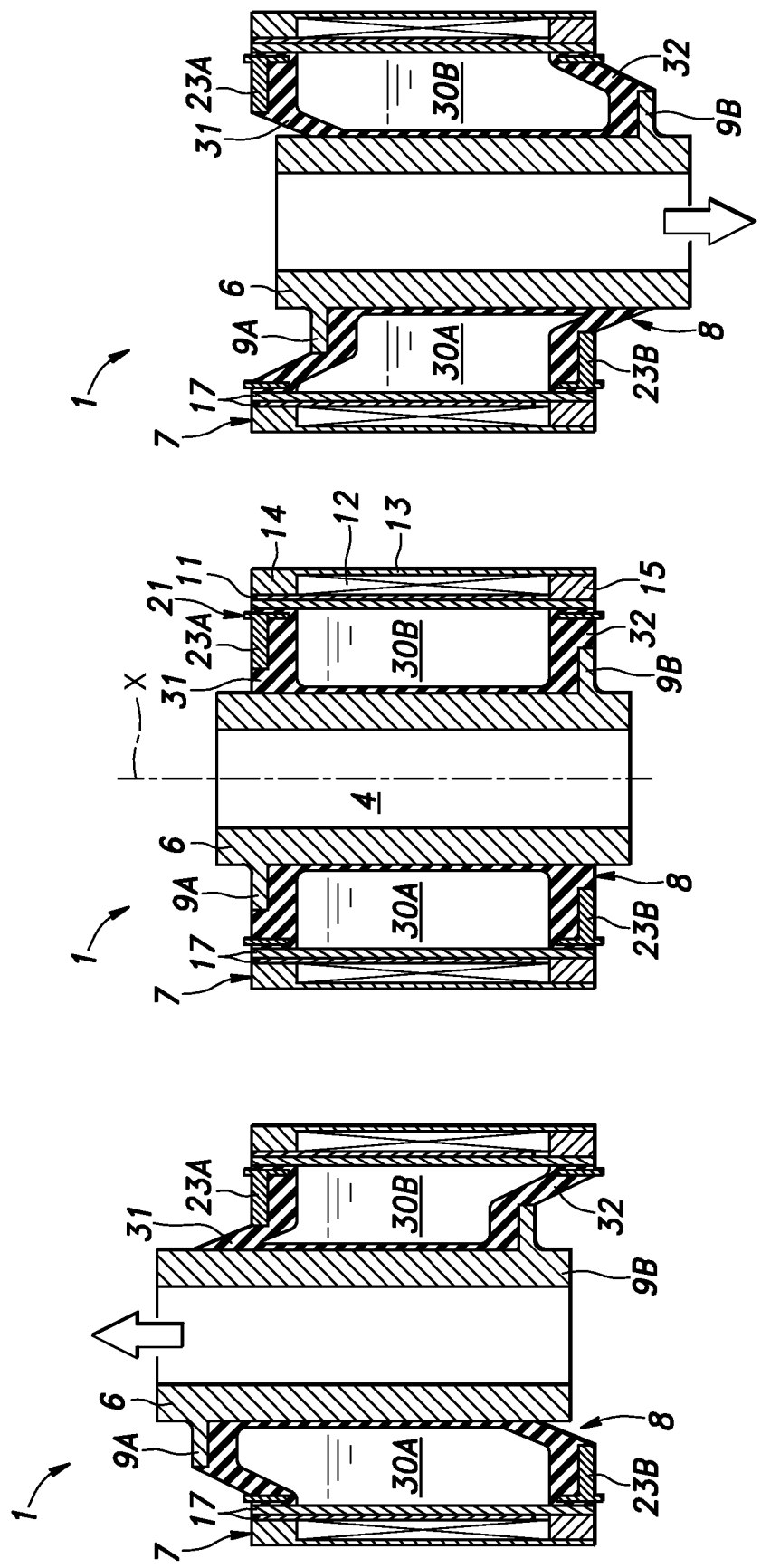
FIG. 8A is a diagram similar to FIG. 5 for explaining a part of the operation of the variable stiffness bushing when an axial displacement takes place therein.
FIG. 8B is a diagram similar to FIG. 5 for explaining a part of the operation of the variable stiffness bushing when an axial displacement takes place therein.
FIG. 8C is a diagram similar to FIG. 5 for explaining a part of the operation of the variable stiffness bushing when an axial displacement takes place therein.

FIG. 7 is a sectional view taken along line VII-VII in FIG. 5. As shown in FIGS. 2, 5, and 7, the two liquid chambers 30 (30A, 30B) are formed at positions opposing each other via the axis X (at positions circumferentially apart from each other by 180 degrees) and are circumferentially separated from each other by the elastic member 8. Thus, the elastic member 8 includes a pair of radial walls 33 each extending radially and axially to define ends of the two liquid chambers 30 circumferentially opposing each other via the radial wall 33. The pair of radial walls 33 is arranged on a straight line passing the axis X in plan view, and the two liquid chambers 30 have the same shape and the same volume when the inner tubular member 6 and the outer tubular member 7 are not displaced relative to each other (or when the variable stiffness bushing 1 is in the neutral state).

As shown in FIGS. 3 and 5, the parts of the tubular portion 22 of the reinforcement member 21 corresponding to the two liquid chambers 30 are each formed with an opening 25, and the reinforcement member 21 is not exposed to the liquid chambers 30.

As shown in FIGS. 2 to 5, the upper and lower inner flange portions 23 (23A, 23B) each have an arc shape circumferentially extending about the axis X over an angle corresponding to the associated liquid chamber 30, and the inner diameter thereof is larger than the outer diameter of the cylindrical portion of the inner tubular member 6. Therefore, the inner circumferential surfaces of the upper and lower inner flange portions 23 are spaced from the outer circumferential surface of the inner tubular member 6. Further, the upper and lower outer flange portions 9 (9A, 9B) each have an arc shape circumferentially extending about the axis X over an angle corresponding to the associated liquid chamber 30, and the outer diameter thereof is smaller than the inner diameter of the tubular portion 22 of the reinforcement member 21. Therefore, the outer circumferential surfaces of the upper and lower outer flange portions 9 are spaced from the inner circumferential surface of the reinforcement member 21.

The upper inner flange portion 23A and the upper outer flange portion 9A are embedded in the upper end wall 31 of the elastic member 8 such that the top surfaces thereof are exposed. The tip end (inner peripheral edge) of the upper inner flange portion 23A opposes the outer circumferential surface of the inner tubular member 6 via a part of the upper end wall 31. The tip end (outer peripheral edge) of the upper outer flange portion 9A opposes the tubular portion 22 of the reinforcement member 21 via a part of the upper end wall 31. The lower inner flange portion 23B and the lower outer flange portion 9B are embedded in the lower end wall 32 of the elastic member 8 such that the bottom surfaces thereof are exposed. The tip end (inner circumferential edge) of the lower inner flange portion 23B opposes the outer circumferential surface of the inner tubular member 6 via a part of the lower end wall 32. The tip end (outer peripheral edge) of the lower outer flange portion 9B opposes the tubular portion 22 of the reinforcement member 21 via a part of the lower end wall 32.

With the above configuration, the inner tubular member 6 can move radially and axially relative to the reinforcement member 21 and the outer tubular member 7 along with a deformation of the elastic member 8 and a volume change of the liquid chambers 30. The separation distance between the reinforcement member 21 and the passage forming member 17 is very small compared to the separation distance between the reinforcement member 21 and the inner tubular member 6. Therefore, the reinforcement member 21 axially moves substantially with the outer tubular member 7.

The upper outer flange portion 9A of the inner tubular member 6 is provided in a part of the inner peripheral portion of the upper end wall 31 and increases the bending stiffness of the inner peripheral portion of the upper end wall 31. The upper inner flange portion 23A of the reinforcement member 21 is provided in a part of the outer peripheral portion of the upper end wall 31 and increases the bending stiffness of the outer peripheral portion of the upper end wall 31. The lower outer flange portion 9B of the inner tubular member 6 is provided in a part of the inner peripheral portion of the lower end wall 32 and increases the bending stiffness of the inner peripheral portion of the lower end wall 32. The lower inner flange portion 23B of the reinforcement member 21 is provided in a part of the outer peripheral portion of the lower end wall 32 and increases the bending stiffness of the outer peripheral portion of the lower end wall 32. Thus, each of these outer flange portions 9 and inner flange portions 23 serves as a reinforcement plate that forms a high bending stiffness portion in the inner peripheral portion or the outer peripheral portion of the upper end wall 31 or the lower end wall 32 associated therewith.

As shown in FIGS. 2 and 7, the two liquid chambers 30 are in communication with the annular magnetic gap 16 via the respective communication holes 19 of the passage forming member 17. The projection 18 of the passage forming member 17 is located on an outer periphery of one of the radial walls 33 and projects into the magnetic gap 16 at a position between the two communication holes 19 to interrupt the circumferential continuity of the magnetic gap 16. Thus, the two liquid chambers 30 are in communication with each other via the two communication holes 19 and the magnetic gap 16, and the two communication holes 19 and the magnetic gap 16 constitute a communication passage 35 communicating the two liquid chambers 30 with each other.

A part of the communication passage 35 formed by the magnetic gap 16 provided in the outer tubular member 7 constitutes the circumferential passage 36 that extends in the circumferential direction. Parts of the communication passage 35 formed by the communication holes 19 extend in the radial direction to communicate the respective liquid chambers 30 with the corresponding ends of the circumferential passage 36.

These two liquid chambers 30 and the communication passage 35 are filled with a magnetic fluid 37. In the present disclosure, the magnetic fluid 37 is an incompressible fluid containing fine ferromagnetic particles such as iron particles dispersed in a solvent such as an oil, and preferably consists of a magneto-rheological fluid (MRF) or a magneto-rheological compound (MRC) whose viscoelasticity (particularly, viscosity) changes depending on the applied magnetic field. In the present embodiment, an MRC is used as the magnetic fluid 37. When a magnetic field is applied to the magnetic fluid 37, the fine iron particles therein are aligned along the direction of the magnetic field to form chain-like clusters. Thereby, the chain-like clusters hinders the flow of the solvent in a direction orthogonal to the magnetic field, whereby the viscosity of the magnetic fluid 37 increases and the magnetic fluid 37 is semi-solidified.

In the present embodiment, the two liquid chambers 30 are arranged side by side along the direction of extension of the lower arm 2 in which the variable stiffness bushing 1 is provided. In the following description, these two liquid chambers 30 will be referred to as a left liquid chamber 30A and a right liquid chamber 30B, respectively.

Next, an operation of the variable stiffness bushing 1 of the present embodiment will be described. When the inner tubular member 6 is displaced laterally relative to the outer tubular member 7 from the state shown in FIG. 5 (neutral state), the elastic member 8 deforms such that the volume of the left liquid chamber 30A and the volume of the right liquid chamber 30B change in an inverse (or complementary) relationship to each other (namely, if the volume of one of the liquid chambers 30 increases, the volume of the other of the liquid chambers 30 decreases). Such a deformation of the elastic member 8 causes the magnetic fluid 37 in the other of the liquid chambers 30 to flow to the one of the liquid chambers 30 via the communication passage 35. At this time, resistance is applied to the magnetic fluid 37 flowing through the communication passage 35 and the vibration acting on the variable stiffness bushing 1 is damped.

FIGS. 8A to 8C are diagrams for explaining the operation of the variable stiffness bushing 1 when an axial displacement takes place therein. FIG. 8B shows a state same as that shown in the sectional view of FIG. 5 (a state in which no axial displacement takes place in the variable stiffness bushing 1), FIG. 8A shows a state in which the inner tubular member 6 is displaced upward relative to the outer tubular member 7, and FIG. 8C shows a state in which the inner tubular member 6 is displaced downward relative to the outer tubular member 7.

As shown in FIG. 8A, when the inner tubular member 6 is displaced upward relative to the outer tubular member 7, the outer peripheral portion of the lower end wall 32 and the inner peripheral portion of the upper end wall 31 related to the left liquid chamber 30A undergo almost no deformation or undergo elastic deformation to have only a small inclination angle, while the inner peripheral portion of the lower end wall 32 and the outer peripheral portion of the upper end wall 31 related to the same undergo elastic deformation to have a large inclination angle. Due to the upward displacement of the inner peripheral portion of the upper end wall 31 that undergoes almost no deformation, the volume of the left liquid chamber 30A becomes larger than that shown in FIG. 8B. On the other hand, the inner peripheral portion of the lower end wall 32 and the outer peripheral portion of the upper end wall 31 related to the right liquid chamber 30B undergo almost no deformation or undergo elastic deformation to have only a small inclination angle, while the outer peripheral portion of the lower end wall 32 and the inner peripheral portion of the upper end wall 31 related to the same undergo elastic deformation to have a large inclination angle. Due to the upward displacement of the inner peripheral portion of the lower end wall 32 that undergoes almost no deformation, the volume of the right liquid chamber 30B becomes smaller than that shown in FIG. 8B.

As shown in FIG. 8C, when the inner tubular member 6 is displaced downward relative to the outer tubular member 7 also, the outer peripheral portion of the lower end wall 32 and the inner peripheral portion of the upper end wall 31 related to the left liquid chamber 30A undergo almost no deformation or undergo elastic deformation to have only a small inclination angle, while the inner peripheral portion of the lower end wall 32 and the outer peripheral portion of the upper end wall 31 related to the same undergo elastic deformation to have a large inclination angle. Due to the downward displacement of the inner peripheral portion of the upper end wall 31 that undergoes almost no deformation, the volume of the left liquid chamber 30A becomes smaller than that shown in FIG. 8B. On the other hand, the inner peripheral portion of the lower end wall 32 and the outer peripheral portion of the upper end wall 31 related to the right liquid chamber 30B undergo almost no deformation or undergo elastic deformation to have only a small inclination angle, while the outer peripheral portion of the lower end wall 32 and the inner peripheral portion of the upper end wall 31 related to the same undergo elastic deformation to have a large inclination angle. Due to the downward displacement of the inner peripheral portion of the lower end wall 32 that undergoes almost no deformation, the volume of the right liquid chamber 30B becomes larger than that shown in FIG. 8B.

Thus, the volume of the left liquid chamber 30A and the volume of the right liquid chamber 30B change in an inverse relationship to each other. When the elastic member 8 undergoes deformation along with such volume change of the liquid chambers 30, the magnetic fluid 37 flows through the communication passage 35. At this time, resistance is applied to the magnetic fluid 37 flowing through the communication passage 35 so that the vibration acting on the variable stiffness bushing 1 is damped.

As shown in FIG. 5, when a voltage is applied to the ends of the copper wire of the coil 12, the electric current flowing through the coil 12 generates a magnetic field around the coil 12. In the partial enlarged view of FIG. 5, magnetic field lines corresponding to the magnetic field generated by the coil 12 are indicated by arrows. The inner yoke 11, the outer yoke 13, and the lower yoke 14 of the outer tubular member 7 jointly form a magnetic circuit, and the magnetic field is concentrated in the circumferential passage 36 of the communication passage 35.

The application of the magnetic field to the circumferential passage 36 increases the viscosity of the magnetic fluid 37 in the communication passage 35. Consequently, the resistance applied to the magnetic fluid 37 flowing through the communication passage 35 increases, and therefore, the vibration damping force for damping the vibration acting on the variable stiffness bushing 1 increases. In addition, the increase in the resistance applied to the magnetic fluid 37 flowing through the communication passage 35 makes the inner tubular member 6 less easy to move relative to the outer tubular member 7, whereby the stiffness of the variable stiffness bushing 1 increases. Thus, it is possible to control the vibration damping force of the variable stiffness bushing 1 by controlling the voltage applied to the coil 12.

Next, advantages of the variable stiffness bushing 1 will be described. In the variable stiffness bushing 1, it is possible to vary the viscosity of the magnetic fluid 37 and to thereby vary the stiffness by supplying electric current to the coil 12. To vary the stiffness effectively, it is preferred that the magnetic field generated by the coil 12, which serves as a magnetic field source, is concentrated in the flow path of the magnetic fluid 37.

In the present embodiment, as shown in FIG. 5, the communication passage 35 communicating the two circumferentially separated liquid chambers 30 (30A, 30B) with each other includes the circumferential passage 36 provided in the outer tubular member 7 to extend in the circumferential direction. The coil 12 is wound coaxially with and provided in the outer tubular member 7, and the outer tubular member 7 includes the inner yoke 11 and the lower yoke 14 defining therebetween the magnetic gap 16, which also serves as the circumferential passage 36. The upper end wall 31 and the lower end wall 32 of the elastic member 8 are configured such that when the inner tubular member 6 and the outer tubular member 7 are axially displaced relative to each other, a difference is created between the volumes of the two liquid chambers 30 (see FIGS. 8A-8C).

With such a configuration, the magnetic fluid 37 flows through the communication passage 35 in accordance with the created volume difference. At this time, by supplying electric current to the coil 12 such that the magnetic field generated around the coil 12 is concentrated in the circumferential passage 36 of the communication passage 35, the flow resistance of the magnetic fluid 37 in the communication passage 35 can be varied. Thus, the axial stiffness (stiffness against the axial displacement between the inner tubular member 6 and the outer tubular member 7) and damping characteristics of the variable stiffness bushing 1 can be varied as desired by controlling the electric current supplied to the coil 12. In addition, the stiffness and damping characteristics of the variable stiffness bushing 1 can be varied with a simple configuration in that the circumferential passage 36, the coil 12, the inner yoke 11, and the lower yoke 14 are provided in the outer tubular member 7.

The part of the upper end wall 31 defining the left liquid chamber 30A includes the upper outer flange portion 9A that forms a high bending stiffness portion on the side of the inner tubular member 6 and the part of the lower end wall 32 defining the left liquid chamber 30A includes the lower inner flange portion 23B that forms a high bending stiffness portion on the side of the outer tubular member 7. In addition, the part of the upper end wall 31 defining the right liquid chamber 30B includes the upper inner flange portion 23A that forms a high bending stiffness portion on the side of the outer tubular member 7 and the part of the lower end wall 32 defining the right liquid chamber 30B includes the lower outer flange portion 9B that forms a high bending stiffness portion on the side of the inner tubular member 6. This arrangement allows a volume difference to be created between the two liquid chambers 30 in accordance with the axial displacement between the inner tubular member 6 and the outer tubular member 7. Further, since the high bending stiffness portions are provided in parts of the upper end wall 31 and the lower end wall 32 of the elastic member 8 on the side of the inner tubular member 6 or the outer tubular member 7, radial displacement between the inner tubular member 6 and the outer tubular member 7 is allowed.

The high bending stiffness portions formed in the upper end wall 31 and the lower end wall 32 include the outer flange portions 9 and the inner flange portions 23 each constituting a reinforcement plate provided in the upper end wall 31 or the lower end wall 32 associated therewith. Thereby, the stiffness of the high bending stiffness portions can be increased owing to the stiffness of the reinforcement plates (the outer flange portions 9 and the inner flange portions 23) without need to considerably increase the thickness of the high bending stiffness portions.

Each of the inner flange portions 23 constituting the reinforcement plates of the high bending stiffness portions provided on the side of the outer tubular member 7 is at least partially embedded in the upper end wall 31 or the lower end wall 32 associated therewith and is not in contact with the inner yoke 11 nor the lower yoke 14. Thereby, the magnetic field lines flowing through the inner yoke 11 and the lower yoke 14 are prevented from being dispersed to the inner flange portions 23, and this allows the magnetic field lines flowing through the yoke to be concentrated in the circumferential passage 36 more reliably.

The reinforcement plates of the high bending stiffness portions provided on the side of the inner tubular member 6 are constituted of the outer flange portions 9 formed integrally with the inner tubular member 6. With this simple configuration, the high bending stiffness portions provided on the side of the inner tubular member 6 can be embodied without increasing the number of components.

The outer tubular member 7 is provided with the tubular passage forming member 17 which is made of non-magnetic material and is disposed between the yoke (the inner yoke 11 and the lower yoke 14) and the elastic member 8 such that the circumferential passage 36 is defined between the tubular passage forming member 17 and the coil 12. The passage forming member 17 is formed with the pair of communication holes 19 (see FIGS. 2 and 7) communicating the circumferential passage 36 with the pair of liquid chambers 30. In such a configuration, the passage forming member 17 prevents the cross-sectional area of the circumferential passage 36 from changing depending on the fluid pressure, whereby it is ensured that the magnetic fluid 37 of an amount corresponding to the volume difference created between the two liquid chambers 30 flows through the circumferential passage 36. Therefore, the axial stiffness of the variable stiffness bushing 1 can be varied accurately by controlling the electric current supplied to the coil 12 to vary the flow resistance of the magnetic fluid 37 in the circumferential passage 36.

Second Embodiment

Next, with reference to FIGS. 9 to 14, a variable stiffness bushing 1 according to the second embodiment of the invention will be described. It is to be noted that the elements similar or the same in form or function as those of the first embodiment will be denoted by the same reference numerals and a duplicated description thereof will be omitted.

Figure 9:
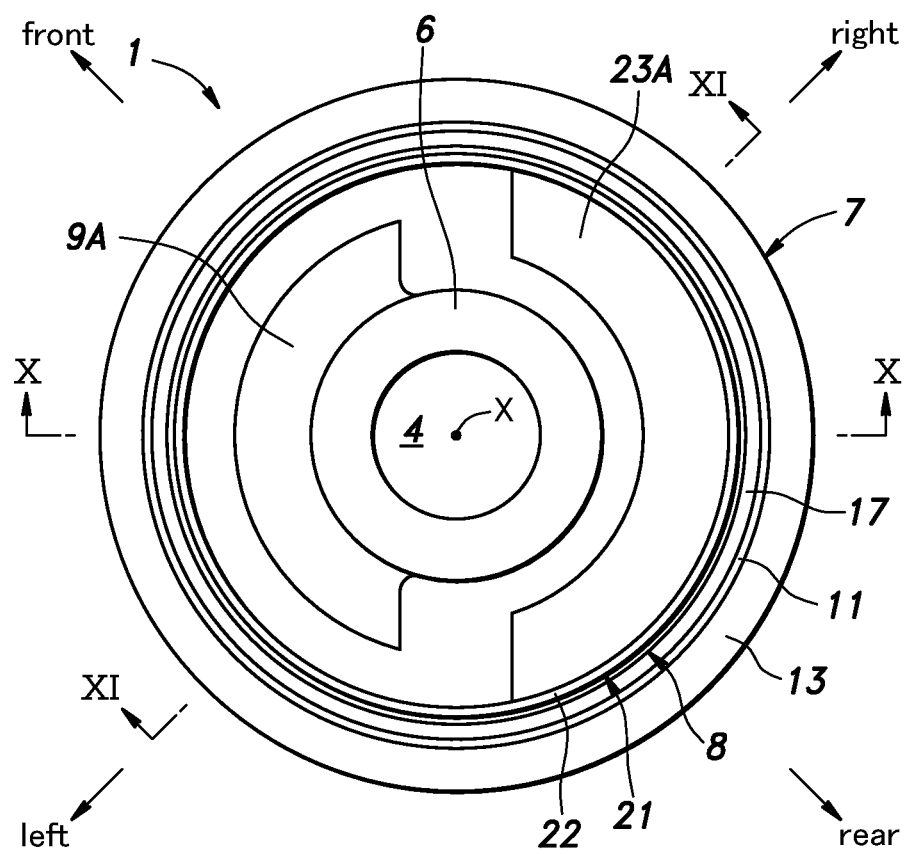
FIG. 9 is a plan view of a variable stiffness bushing according to the second embodiment.
Figure 10:
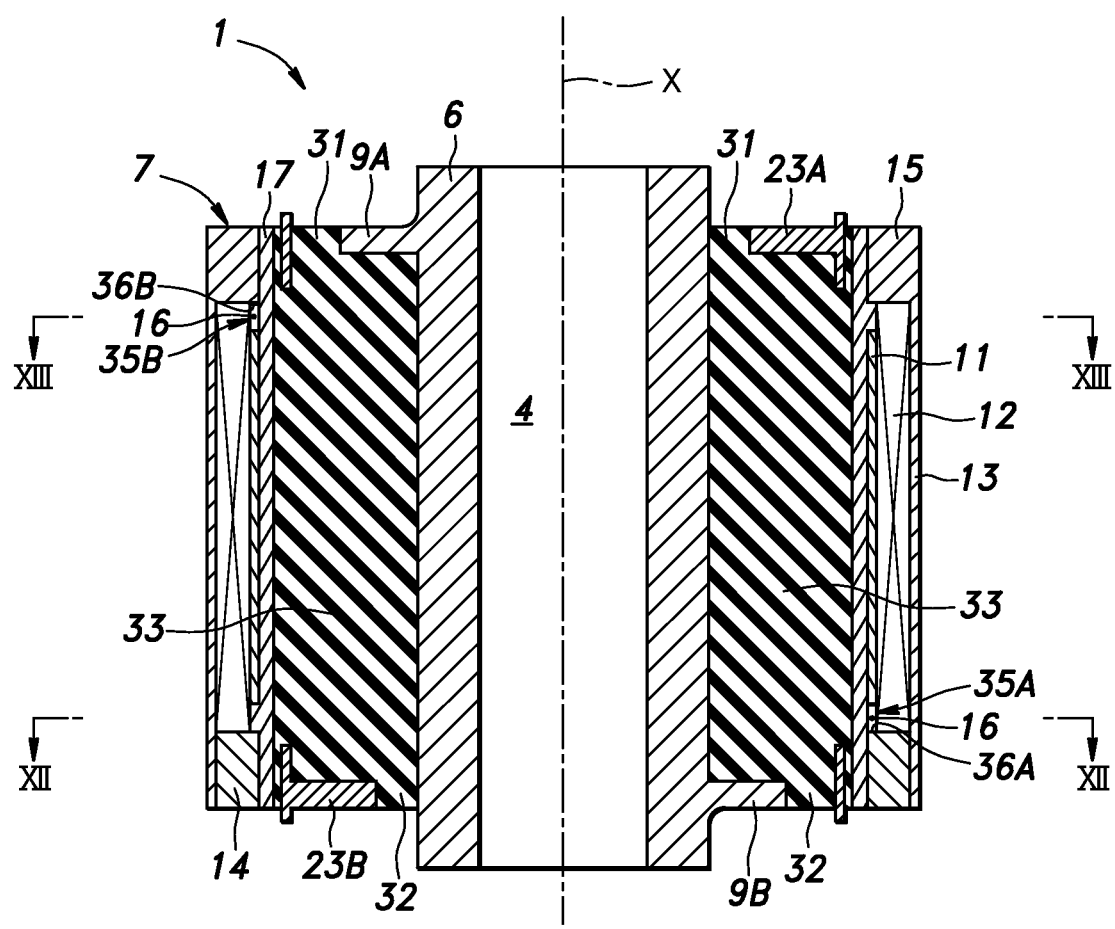
FIG. 10 is a sectional view taken along line X-X in FIG. 9.

FIG. 9 is a plan view of the variable stiffness bushing 1 according to the second embodiment, and FIGS. 10 and 11 are sectional views taken along line X-X and line XI-XI in FIG. 9, respectively. As shown in FIGS. 9 to 11, in the variable stiffness bushing 1 of the second embodiment, the communication passage 35 includes two communication passages 35; namely, a first communication passage 35A and a second communication passage 35B. The first communication passage 35A includes a first circumferential passage 36A formed in a position corresponding to a lower side of the coil 12. The second communication passage 35B includes a second circumferential passage 36B formed in a position corresponding to an upper side of the coil 12.

To form the two communication passages 35, the outer tubular member 7 is configured as follows. The flange part 15 provided in the upper end of the outer yoke 13 has an inner diameter same as the inner diameter of the inner yoke 11. The inner yoke 11 has an axial length shorter than that of the coil 12. The inner yoke 11 is arranged such that the upper end thereof is positioned lower than the upper end of the coil 12 (or the bottom surface of the flange part 15) and the lower end thereof is positioned higher than the lower end of the coil 12 (or the top surface of the lower yoke 14). Thereby, two annular magnetic gaps 16 are formed on the inner periphery of the coil 12; one being defined between the inner yoke 11 and the flange part 15 and the other being defined between the inner yoke 11 and the lower yoke 14, and parts of these magnetic gaps 16 in the circumferential direction constitute the two circumferential passages 36 (36A, 36B), respectively.

Figure 12:
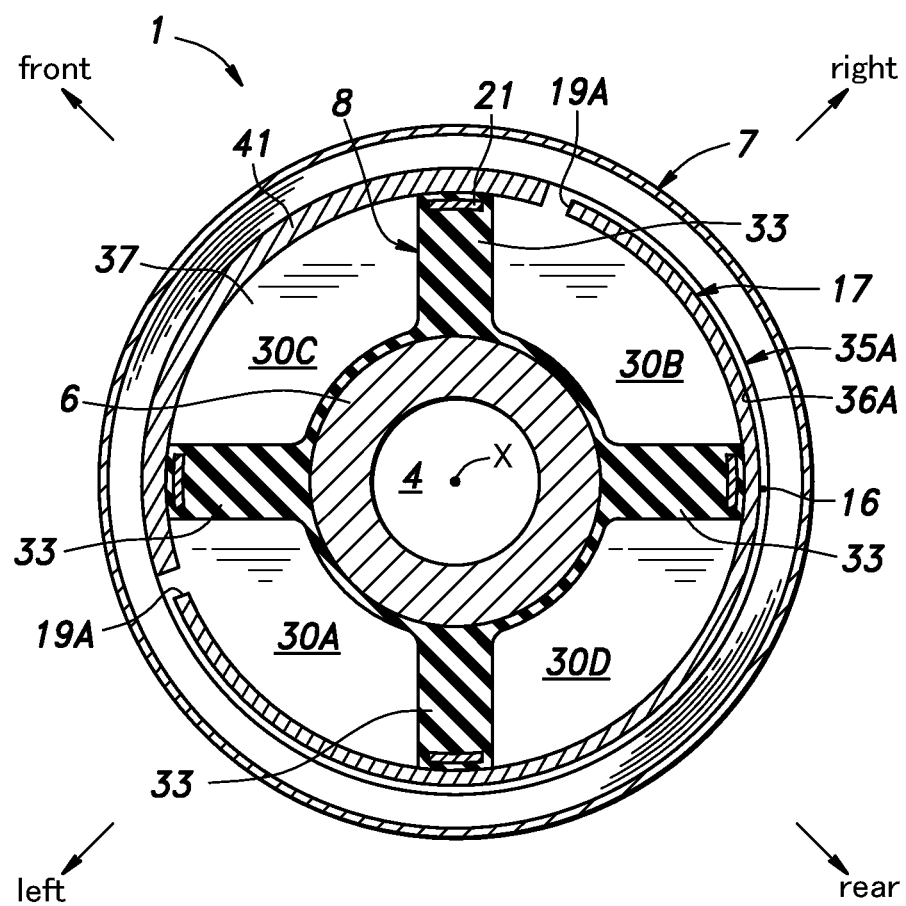
FIG. 12 is a sectional view taken along line XII-XII in FIG. 10.
Figure 13:
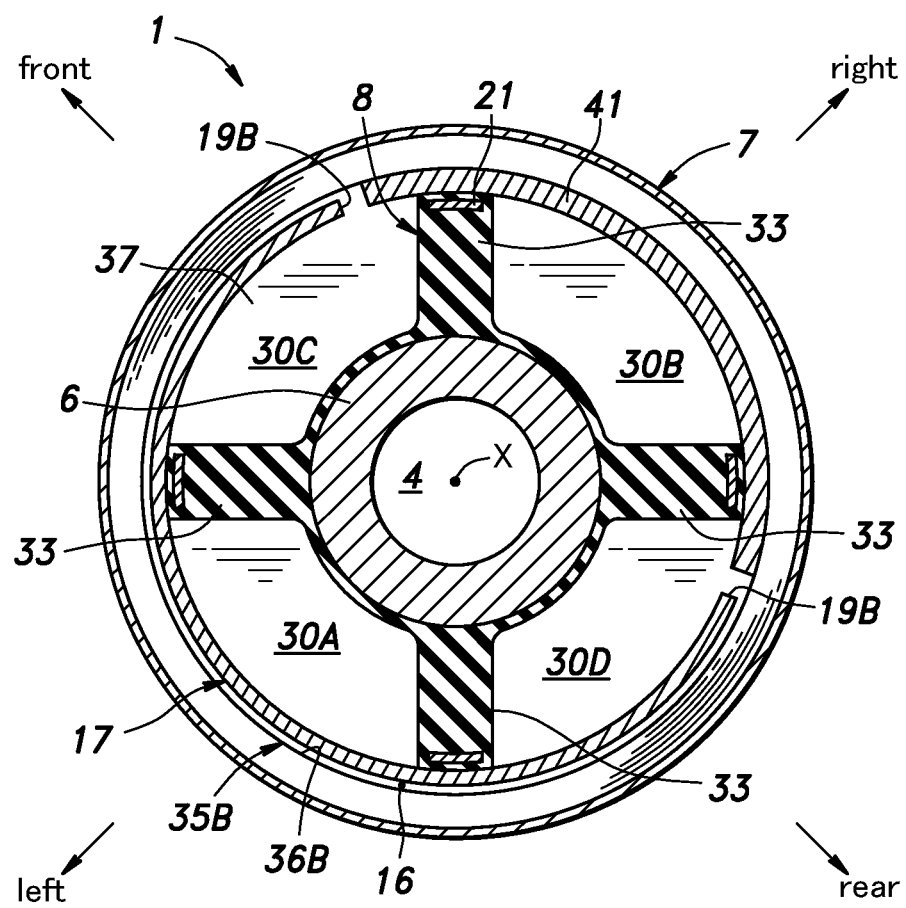
FIG. 13 is a sectional view taken along line XIII-XIII in FIG. 10.
Figure 14:
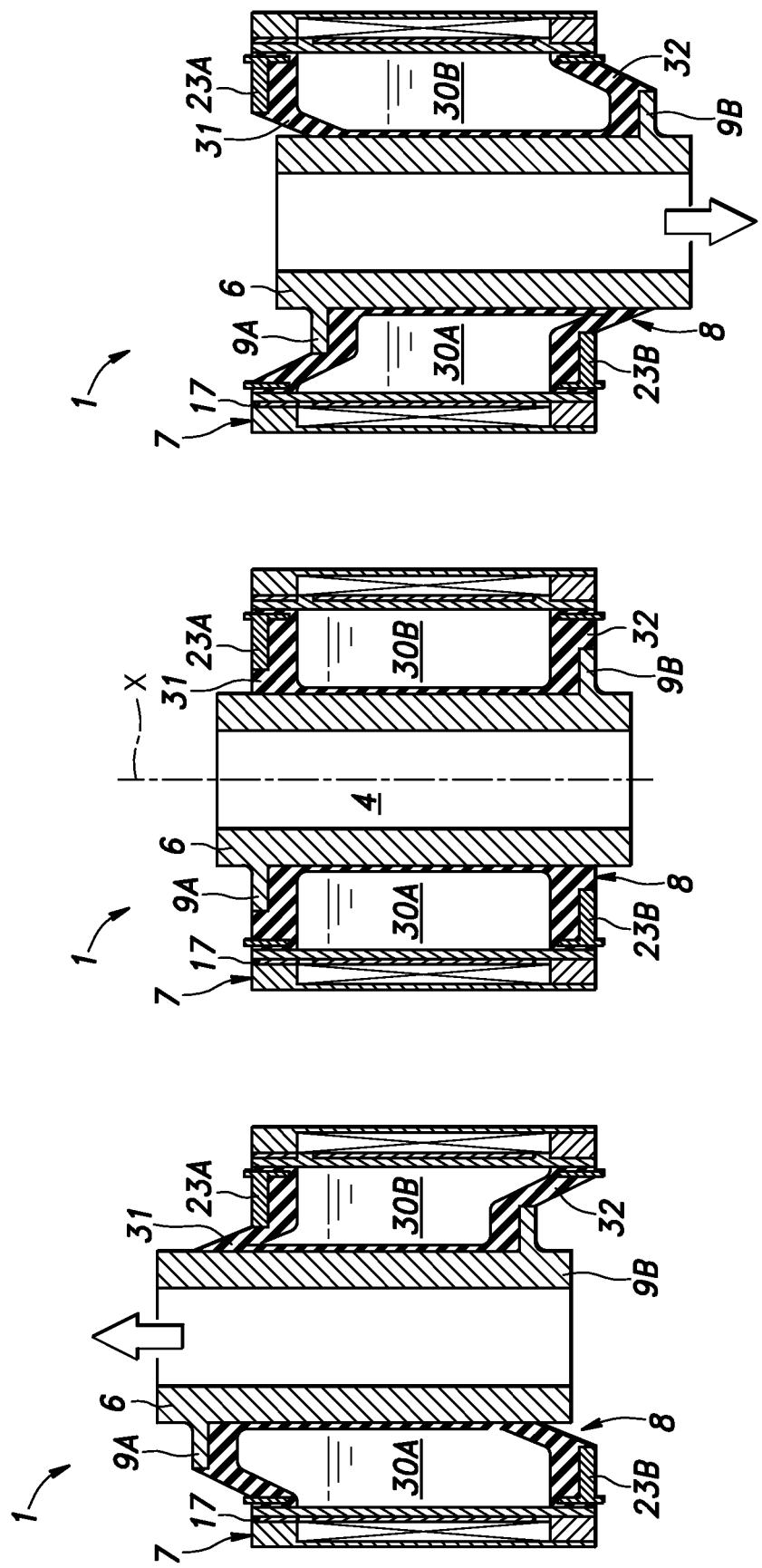
FIG. 14A is a diagram for explaining a part of the operation of the variable stiffness bushing according to the second embodiment when an axial displacement takes place therein.
FIG. 14B is a diagram for explaining a part of the operation of the variable stiffness bushing according to the second embodiment when an axial displacement takes place therein.
FIG. 14C is a diagram for explaining a part of the operation of the variable stiffness bushing according to the second embodiment when an axial displacement takes place therein.

FIGS. 12 and 13 are sectional views taken along line XII-XII and line XIII-XIII in FIG. 10, respectively. As shown in FIGS. 11 to 13, the elastic member 8 cooperates with the passage forming member 17 to form four liquid chambers 30 (30A, 30B, 30C, 30D) arranged in the circumferential direction. These liquid chambers 30 are constituted of two pairs of liquid chambers 30, in which the liquid chambers 30 of each pair are formed at positions opposing each other via the axis X (at positions circumferentially apart from each other by 180 degrees). In the following description, these four liquid chambers 30 are referred to as left liquid chamber 30A, a right liquid chamber 30B, a front liquid chamber 30C, and a rear liquid chamber 30D, respectively. The left liquid chamber 30A and the right liquid chamber 30B form a first pair, and the front liquid chamber 30C and the rear liquid chamber 30D form a second pair.

The elastic member 8 includes four radial walls 33 each extending radially and axially to define ends of the two liquid chambers 30 circumferentially opposing each other via the radial wall 33. The four radial walls 33 are arranged in a cross shape passing the axis X in plan view. The four liquid chambers 30 have the same shape and the same volume when the inner tubular member and the outer tubular member are not displaced relative to each other (or when the variable stiffness bushing 1 is in the neutral state).

As shown in FIG. 12, the lower first communication passage 35A communicates the left liquid chamber 30A and the right liquid chamber 30B with each other. The first circumferential passage 36A extends over an angle range of about 250 degrees about the axis X so as to extend over substantially the entire outer periphery of the left liquid chamber 30A, the rear liquid chamber 30D, and the right liquid chamber 30B in the circumferential direction. The part of the annular magnetic gap 16 that does not constitute the first circumferential passage 36A is filled with a protrusion 41 formed on the outer circumferential surface of the passage forming member 17 to extend over an angle range of about 110 degrees in the circumferential direction. The first circumferential passage 36A is in communication with the left liquid chamber 30A and the right liquid chamber 30B via two first the communication holes 19A formed to extend through the passage forming member 17 at positions corresponding to the circumferential ends of the first circumferential passage 36A, respectively.

As shown in FIG. 13, the upper second communication passage 35B communicates the front liquid chamber 30C and the rear liquid chamber 30D with each other. The second circumferential passage 36B extends over an angle range of about 250 degrees about the axis X so as to extend over substantially the entire outer periphery of the front liquid chamber 30C, the left liquid chamber 30A, and the rear liquid chamber 30D in the circumferential direction. The part of the annular magnetic gap 16 that does not constitute the second circumferential passage 36B is filled with another protrusion 41 formed on the outer circumferential surface of the passage forming member 17 to extend over an angle range of about 110 degrees in the circumferential direction. The second circumferential passage 36B is in communication with the front liquid chamber 30C and the rear liquid chamber 30D via two second communication holes 19B formed to extend through the passage forming member 17 at positions corresponding to the circumferential ends of the second circumferential passage 36B, respectively.

As shown in FIGS. 9 to 12, the upper outer flange portion 9A is provided in a portion of the upper end wall 31 defining the left liquid chamber 30A and the front liquid chamber 30C. The upper inner flange portion 23A is provided in a portion of the upper end wall 31 defining the right liquid chamber 30B and the rear liquid chamber 30D. The lower outer flange portion 9B is provided in a portion of the lower end wall 32 defining the right liquid chamber 30B and the rear liquid chamber 30D. The lower inner flange portion 23B is provided in a portion of the lower end wall 32 defining the left liquid chamber 30A and the front liquid chamber 30C.

Next, an operation of the variable stiffness bushing 1 according to the second embodiment will be described. As will be appreciated by referring to FIG. 12, when the inner tubular member 6 is displaced laterally relative to the outer tubular member 7, the elastic member 8 deforms such that the volume of the left liquid chamber 30A and the volume of the right liquid chamber 30B change in an inverse relationship to each other (namely, if the volume of one of the liquid chambers 30A and 30B increases, the volume of the other of the liquid chambers 30A and 30B decreases). Such a deformation of the elastic member 8 causes the magnetic fluid 37 in the other of the liquid chambers 30A and 30B to flow to the one of the liquid chambers 30A and 30B via the first communication passage 35A. At this time, resistance is applied to the magnetic fluid 37 flowing through the first communication passage 35A and the vibration acting on the variable stiffness bushing 1 is damped.

As will be appreciated by referring to FIG. 13, when the inner tubular member 6 is displaced in the fore and aft direction relative to the outer tubular member 7, the elastic member 8 deforms such that the volume of the front liquid chamber 30C and the volume of the rear liquid chamber 30D change in an inverse relationship to each other (namely, if the volume of one of the liquid chambers 30C and 30D increases, the volume of the other of the liquid chambers 30C and 30D decreases). Such a deformation of the elastic member 8 causes the magnetic fluid 37 in the other of the liquid chambers 30C and 30D to flow to the one of the liquid chambers 30C and 30D via the second communication passage 35B. At this time, resistance is applied to the magnetic fluid 37 flowing through the second communication passage 35B and the vibration acting on the variable stiffness bushing 1 is damped.

FIGS. 14A to 14C are diagrams for explaining the operation of the variable stiffness bushing 1 according to the second embodiment when an axial displacement takes place therein. FIG. 14B shows a state same as that shown in the sectional view of FIG. 11 (a state in which no axial displacement takes place in the variable stiffness bushing 1), FIG. 14A shows a state in which the inner tubular member 6 is displaced upward relative to the outer tubular member 7, and FIG. 14C shows a state in which the inner tubular member 6 is displaced downward relative to the outer tubular member 7.

As shown in FIG. 14A, when the inner tubular member 6 is displaced upward relative to the outer tubular member 7, the outer peripheral portion of the lower end wall 32 and the inner peripheral portion of the upper end wall 31 related to the left liquid chamber 30A and the front liquid chamber 30C undergo almost no deformation or undergo elastic deformation to have only a small inclination angle, while the inner peripheral portion of the lower end wall 32 and the outer peripheral portion of the upper end wall 31 related to the same undergo elastic deformation to have a large inclination angle. Due to the upward displacement of the inner peripheral portion of the upper end wall 31 that undergoes almost no deformation, the volume of each of the left liquid chamber 30A and the front liquid chamber 30C becomes larger than that shown in FIG. 14B. On the other hand, the inner peripheral portion of the lower end wall 32 and the outer peripheral portion of the upper end wall 31 related to the right liquid chamber 30B and the rear liquid chamber 30D undergo almost no deformation or undergo elastic deformation to have only a small inclination angle, while the outer peripheral portion of the lower end wall 32 and the inner peripheral portion of the upper end wall 31 related to the same undergo elastic deformation to have a large inclination angle. Due to the upward displacement of the inner peripheral portion of the lower end wall 32 that undergoes almost no deformation, the volume of each of the right liquid chamber 30B and the rear liquid chamber 30D becomes smaller than that shown in FIG. 14B.

As shown in FIG. 14C, when the inner tubular member 6 is displaced downward relative to the outer tubular member 7 also, the outer peripheral portion of the lower end wall 32 and the inner peripheral portion of the upper end wall 31 related to the left liquid chamber 30A and the front liquid chamber 30C undergo almost no deformation or undergo elastic deformation to have only a small inclination angle, while the inner peripheral portion of the lower end wall 32 and the outer peripheral portion of the upper end wall 31 related to the same undergo elastic deformation to have a large inclination angle. Due to the downward displacement of the inner peripheral portion of the upper end wall 31 that undergoes almost no deformation, the volume of each of the left liquid chamber 30A and the front liquid chamber 30C becomes smaller than that shown in FIG. 14B. On the other hand, the inner peripheral portion of the lower end wall 32 and the outer peripheral portion of the upper end wall 31 related to the right liquid chamber 30B and the rear liquid chamber 30D undergo almost no deformation or undergo elastic deformation to have only a small inclination angle, while the outer peripheral portion of the lower end wall 32 and the inner peripheral portion of the upper end wall 31 related to the same undergo elastic deformation to have a large inclination angle. Due to the downward displacement of the inner peripheral portion of the lower end wall 32 that undergoes almost no deformation, the volume of each of the right liquid chamber 30B and the rear liquid chamber 30D becomes larger than that shown in FIG. 14B.

As described above, the volume of the left liquid chamber 30A and the front liquid chamber 30C and the volume of the right liquid chamber 30B and the rear liquid chamber 30D change in an inverse relationship to each other. When the elastic member 8 undergoes deformation along with such volume change of the liquid chambers 30, the magnetic fluid 37 flows through the first communication passage 35A and the second communication passage 35B. At this time, resistance is applied to the magnetic fluid 37 flowing through these communication passages 35 so that the vibration acting on the variable stiffness bushing 1 is damped.

As shown in FIG. 11, when a voltage is applied to the ends of the copper wire of the coil 12, the electric current flowing through the coil 12 generates a magnetic field around the coil 12. In the partial enlarged view of FIG. 11, magnetic field lines corresponding to the magnetic field generated by the coil 12 are indicated by arrows. The inner yoke 11, the outer yoke 13, and the lower yoke 14 of the outer tubular member 7 jointly form a magnetic circuit, and the magnetic field is concentrated in the first circumferential passage 36A of the first communication passage 35A and the second circumferential passage 36B of the second communication passage 35B.

The application of the magnetic field to these circumferential passages 36 increases the viscosity of the magnetic fluid 37 in the first communication passage 35A and the second communication passage 35B. This increases the resistance applied to the magnetic fluid 37 flowing through the first communication passage 35A and the magnetic fluid 37 flowing through the second communication passage 35B, whereby the damping force for damping the vibration acting on the variable stiffness bushing 1 increases. In addition, the increase in the resistance applied to the magnetic fluid 37 flowing through the first communication passage 35A and the magnetic fluid 37 flowing through the second communication passage 35B makes the inner tubular member 6 less easy to move relative to the outer tubular member 7, whereby the stiffness of the variable stiffness bushing 1 increases. Thus, it is possible to control the vibration damping force of the variable stiffness bushing 1 by controlling the voltage applied to the coil 12.

The variable stiffness bushing 1 according to the second embodiment can provide advantages similar to those provided in the first embodiment. In addition, in the second embodiment, the liquid chambers 30 include a first pair of liquid chambers 30 (the left liquid chamber 30A and the right liquid chamber 30B) and a second pair of liquid chambers 30 (the front liquid chamber 30C and the rear liquid chamber 30D), where the liquid chambers 30 of each pair are circumferentially spaced from each other by a predetermined distance so as to oppose each other with the inner tubular member 6 interposed therebetween. Further, the communication passage 35 includes the first communication passage 35A communicating the liquid chambers 30 of the first pair with each other and the second communication passage 35B communicating the liquid chambers 30 of the second pair with each other.

Thereby, when the inner tubular member 6 and the outer tubular member 7 are displaced relative to each other in an opposing direction of the first pair of liquid chambers 30 or an opposing direction of the second pair of liquid chambers 30, a volume difference is created between the two liquid chambers 30 opposing in this direction. In response thereto, the magnetic fluid 37 of an amount corresponding to the created volume difference flows through the first communication passage 35A or the second communication passage 35B. Thus, the radial stiffness (stiffness against the radial displacement between the inner tubular member 6 and the outer tubular member 7) and damping characteristics of the variable stiffness bushing 1 can be varied as desired by controlling the electric current supplied to the coil 12.

The first circumferential passage 36A of the first communication passage 35A is formed at a position corresponding to an upper side of the coil 12 and the second circumferential passage 36B of the second communication passage 35B is formed at a position corresponding to a lower side of the coil 12. Therefore, the first circumferential passage 36A and the second circumferential passage 36B can be arranged such that they are spaced from each other but are both close to the coil 12, such that the magnetic field generated by the coil 12 can be concentrated in each of these circumferential passages 36 effectively.

Third Embodiment

Figure 15:
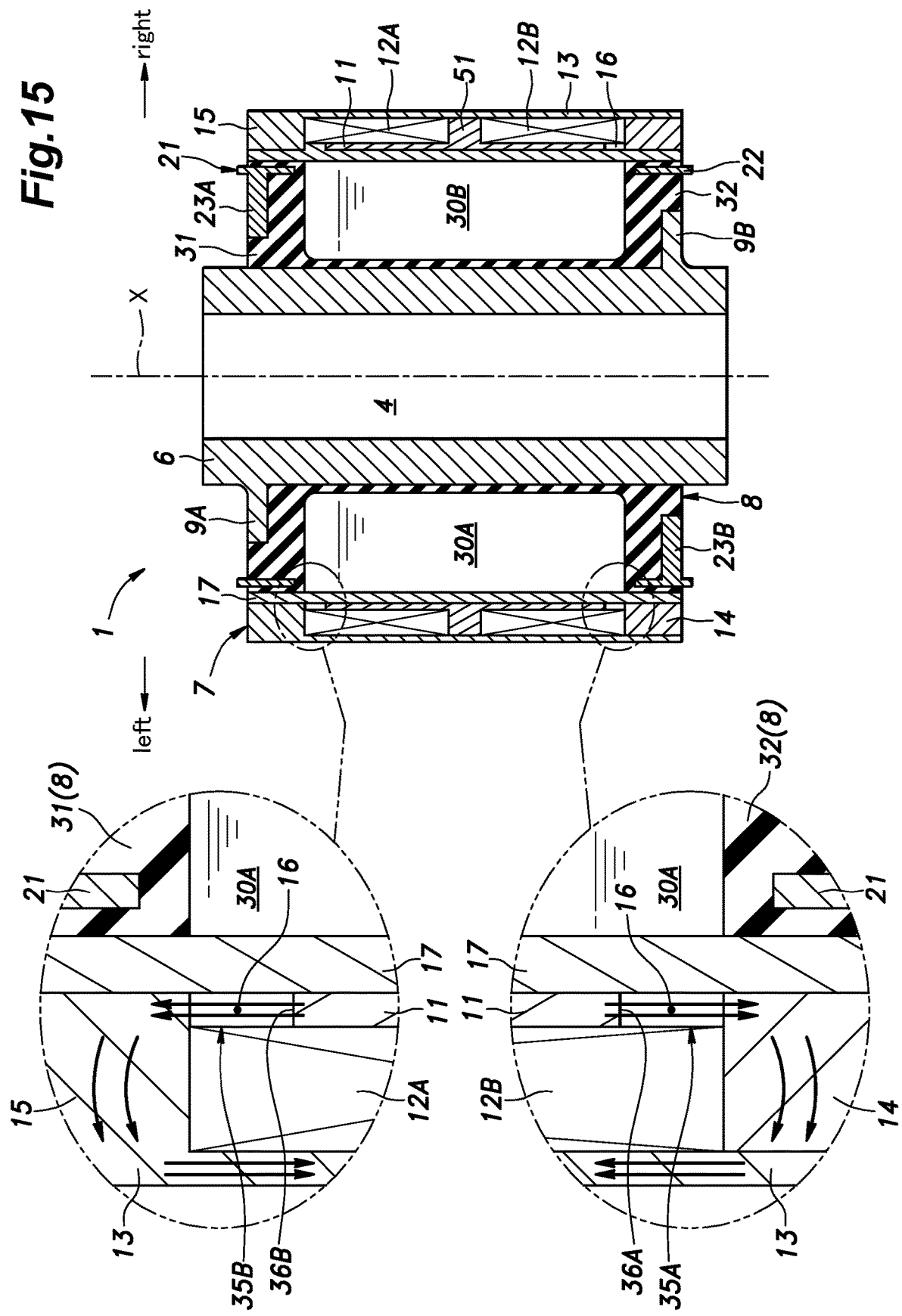
FIG. 15 is a sectional view similar to FIG. 10 and showing a variable stiffness bushing according to the third embodiment.

Next, with reference to FIG. 15, a variable stiffness bushing 1 according to the third embodiment of the invention will be described. It is to be noted that the elements similar or the same in form or function as those of the second embodiment will be denoted by the same reference numerals and a duplicated description thereof will be omitted.

In the variable stiffness bushing 1 of the third embodiment, the coil 12 is divided into upper and lower parts at an axially intermediate position thereof or is constituted of a pair of vertically arranged cylindrical coils 12 (an upper first coil 12A and a lower second coil 12B). The first coil 12A and the second coil 12B are spaced apart in the axial direction. The space between the first coil 12A and the second coil 12B is filled with an annular portion 51 protruding from the inner yoke 11. The annular portion 51 protrudes radially outward from the outer circumferential surface of the inner yoke 11, is made of the material same as that of the inner yoke 11 to be integral with the inner yoke 11, and is joined to the outer yoke 13 on an outer circumference thereof.

The first coil 12A and the second coil 12B are configured to generate magnetic fields in mutually opposing directions. The first coil 12A and the second coil 12B are constituted of two respective copper wires that are not electrically connected to each other. The two end portions of the first coil 12A and the two end portions of the second coil 12B are drawn out from the outer tubular member 7 as lead wires. Electric current is supplied to the first coil 12A and the second coil 12B at appropriate timings via the respective pairs of the lead wires.

When electric current flows through the first coil 12A and the second coil 12B, the first coil 12A and the second coil 12B generate magnetic fields in mutually opposing directions. In the partial enlarged views of FIG. 15, magnetic field lines corresponding to the magnetic field generated by each coil 12 are indicated by arrows. The inner yoke 11, the outer yoke 13, the lower yoke 14, and the annular portion 51 of the outer tubular member 7 jointly form a magnetic circuit, and the magnetic field is concentrated in the circumferential passage 36 of each communication passage 35. Namely, the annular portion 51 formed between the first coil 12A and the second coil 12B also constitutes a yoke, and the magnetic field lines of the first coil 12A and the magnetic field lines of the second coil 12B both pass through the annular portion 51 of the inner yoke 11.

The application of the magnetic field to the first circumferential passage 36A increases the viscosity of the magnetic fluid 37 in the first communication passage 35A. Also, the application of the magnetic field to the second circumferential passage 36B increases the viscosity of the magnetic fluid 37 in the second communication passage 35B. Consequently, the resistance applied to the magnetic fluid 37 flowing through these communication passages 35 increases, and therefore, the damping force for damping the vibration acting on the variable stiffness bushing 1 increases. In addition, the increase in the resistance applied to the magnetic fluid 37 flowing through the communication passages 35 makes the inner tubular member 6 less easy to move relative to the outer tubular member 7, whereby the stiffness of the variable stiffness bushing 1 increases.

When the magnetic field is applied to both the first circumferential passage 36A and the second circumferential passage 36B, the resistance applied to the magnetic fluid 37 flowing through the first communication passage 35A and the magnetic fluid 37 flowing through the second communication passage 35B increases. Thereby, the vibration damping force and the stiffness of the variable stiffness bushing 1 are increased in each of the vertical direction, the fore and aft direction, and the lateral direction. When the magnetic field is applied to only the first circumferential passage 36A, the vibration damping force and the stiffness of the variable stiffness bushing 1 are increased in the lateral direction and are also increased slightly in the vertical direction. When the magnetic field is applied to only the second circumferential passage 36B, the vibration damping force and the stiffness of the variable stiffness bushing 1 are increased in the fore and aft direction and are also increased slightly in the vertical direction.

Thus, it is possible to control the vibration damping force of the variable stiffness bushing 1 by controlling the voltage applied to at least one of the first coil 12A and the second coil 12B.

As described above, in the variable stiffness bushing 1 of the third embodiment, the coil 12 is constituted of the first coil 12A and the second coil 12B arranged to be spaced from each other in the axial direction. Further, the first circumferential passage 36A of the first communication passage 35A is provided at a position corresponding to the first coil 12A in the axial direction, and the second circumferential passage 36B of the second communication passage 35B is provided at a position corresponding to the second coil 12B in the axial direction. Thereby, it is possible to individually vary the flow resistance in each of the first circumferential passage 36A and the second circumferential passage 36B by individually controlling the electric current supplied to each of the first coil 12A and the second coil 12B. Therefore, when the inner tubular member 6 and the outer tubular member 7 are displaced relative to each other in the radial direction, the stiffness of the variable stiffness bushing 1 can be varied independently in the lateral direction, which is the opposing direction of the first pair of liquid chambers 30, and in the fore and aft direction, which is the opposing direction of the second pair of liquid chambers 30.

It is to be noted that when the magnetic field is applied to both the first circumferential passage 36A and the second circumferential passage 36B, the first coil 12A and the second coil 12B may generate magnetic fields in the same direction. By generating the magnetic fields in the same direction, a magnetic field amplified by the magnetic field generated by the first coil 12A and the magnetic field generated by the second coil 12B is applied to both of the first circumferential passage 36A and the second circumferential passage 36B. Thereby, the resistance applied to the magnetic fluid 37 flowing through the first communication passage 35A and the resistance applied to the magnetic fluid 37 flowing through the second communication passage 35B can be increased effectively, and hence, the vibration damping force and the stiffness of the variable stiffness bushing 1 can be increased effectively.

In the following, exemplary uses of the above-described variable stiffness bushing 1 will be described.

Figure 16:
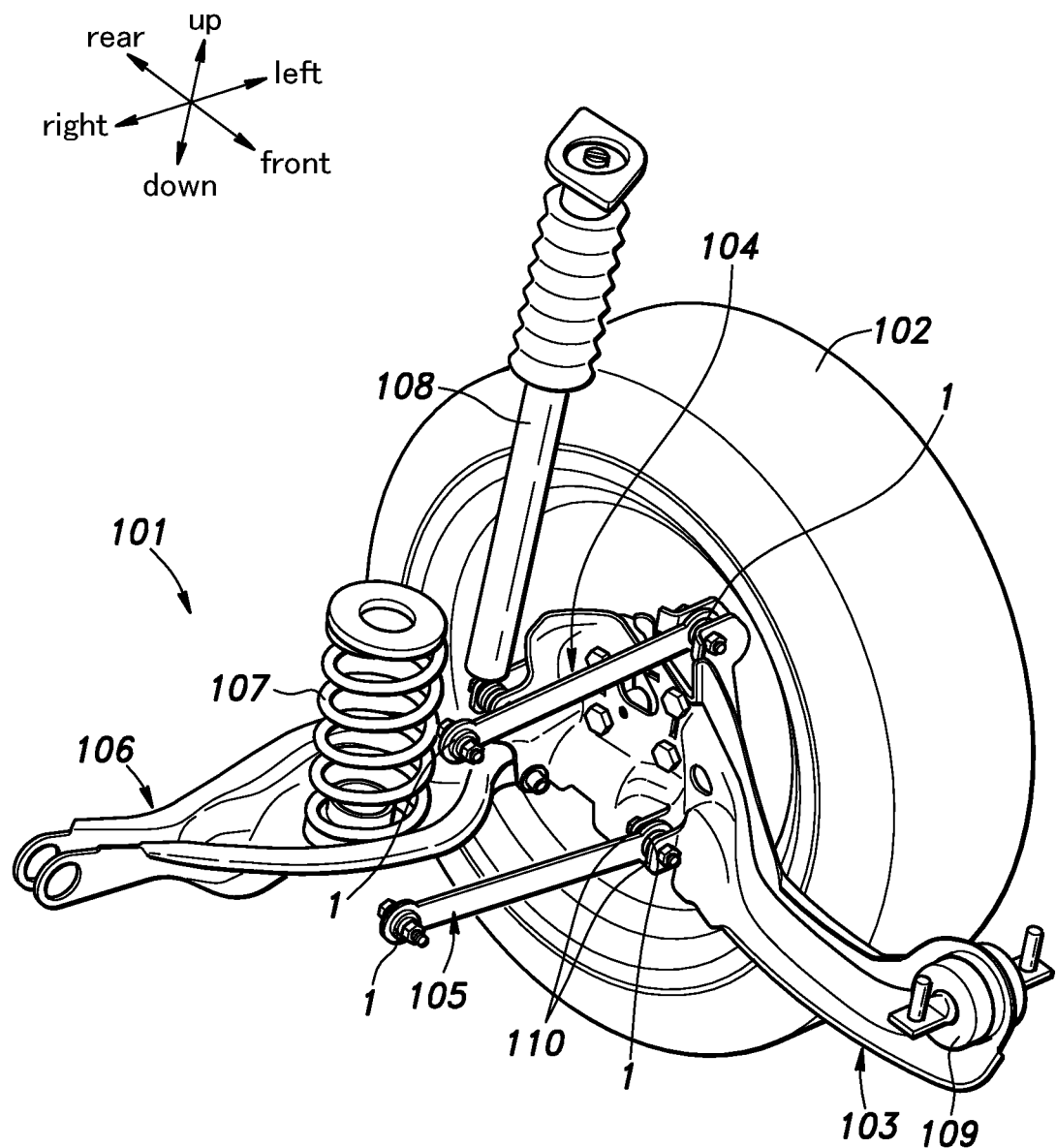
FIG. 16 is an explanatory diagram showing an exemplary use of the variable stiffness bushing.

FIG. 16 shows an example in which the variable stiffness bushing 1 shown in the foregoing embodiments is used in the suspension 101 of an automobile. This suspension 101 is a rear suspension configured to support a left rear wheel 102 and consists of an independent suspension (more specifically, a double wishbone suspension). As shown in FIG. 16, the suspension 101 includes a trailing arm 103, an upper arm 104, a first lower arm 105, a second lower arm 106, a spring 107, and a damper 108.

The trailing arm 103 is a member extending in the fore and aft direction and has a front end pivotally supported by the vehicle body 112 (see FIG. 17) via a bushing 109. The left rear wheel 102 is rotatably supported at the rear end of the trailing arm 103.

The first lower arm 105 is a sheet metal member extending substantially in the vehicle width direction and has an outboard end pivotally connected to the trailing arm 103. The trailing arm 103 is provided with a pair of plate-shaped supports 110 arranged to be spaced in the fore and aft direction, and each support 110 is formed with a through-hole passing therethrough substantially in the fore and aft direction. The outboard end of the first lower arm 105 is fitted with a variable stiffness bushing 1 and a bolt passed through the bolt insertion hole 4 of the variable stiffness bushing 1 is fastened to the through-holes of the supports 110 of the trailing arm 103, whereby the outboard end of the first lower arm 105 is pivotally connected to the trailing arm 103 via the variable stiffness bushing 1. The inboard end of the first lower arm 105 is pivotally connected to the vehicle body 112 via another variable stiffness bushing 1 in a similar manner.

The second lower arm 106 is a member extending substantially in the vehicle width direction and has an outboard end pivotally connected to the trailing arm 103 and an inboard end pivotally connected to the vehicle body 112. The vehicle body 112 has a part located above the second lower arm 106, and the spring 107 is interposed between the vehicle body 112 and the second lower arm 106. The damper 108 has a lower end pivotally connected to the second lower arm 106 and an upper end supported by the vehicle body 112. The spring 107 and the damper 108 function as a shock absorber for absorbing vibrations transmitted from the road surface to the vehicle body 112.

Similarly to the first lower arm 105, the upper arm 104 is a member extending substantially in the vehicle width direction and has an outboard end pivotally connected to the second lower arm 106 via a variable stiffness bushing 1 and an inboard end pivotally connected to the vehicle body 112 via another variable stiffness bushing 1 in a similar manner as in the first lower arm 105. These variable stiffness bushings 1 may each be realized by any of the variable stiffness bushings 1 shown in the foregoing embodiments.

Figure 17:
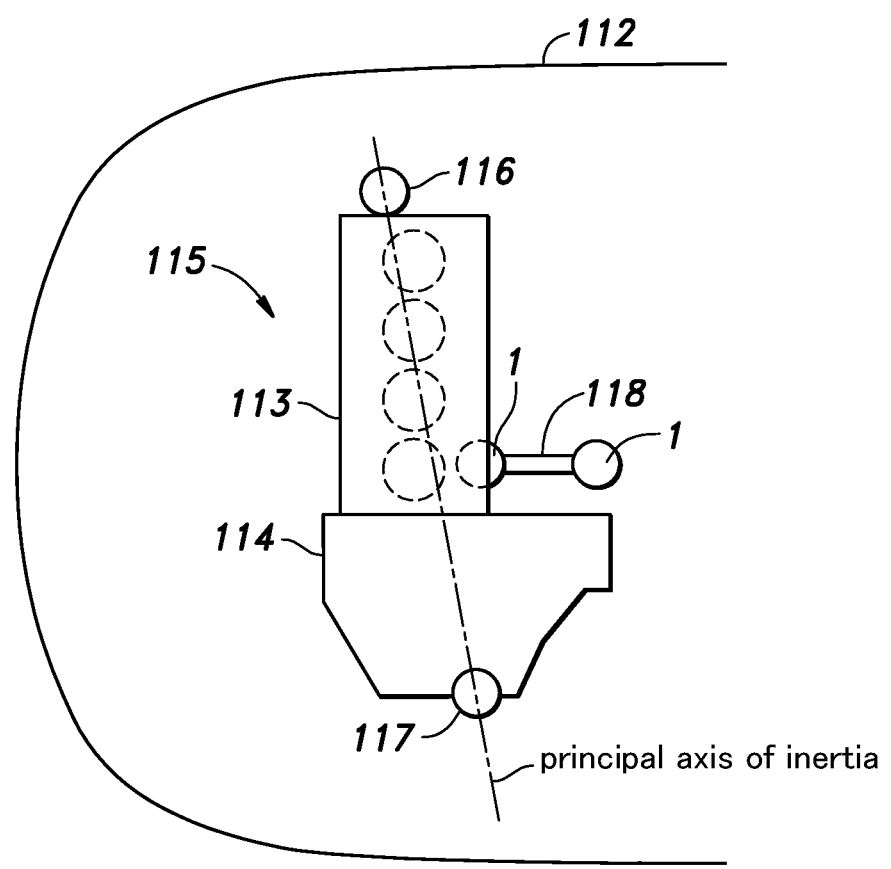
FIG. 17 is an explanatory diagram showing another exemplary use of the variable stiffness bushing.

FIG. 17 shows an example in which the variable stiffness bushing 1 shown in the foregoing embodiments is used in an engine support of an automobile. An engine 113 is placed in a front part of the vehicle body 112 of the automobile in a transverse position. The engine 113 is integrally provided with a transmission 114, and the engine 113 and the transmission 114 form a power plant 115. The power plant 115 is supported by the vehicle body 112 via two engine mounts 116, 117 (a side mount and a trans mount) and a torque rod 118.

The two engine mounts 116, 117 are configured to support the main load (own weight) of the power plant 115 and are located on the principal axis of inertia of the whole power plant 115. On the other hand, the torque rod 118 is connected to the engine 113 on one longitudinal end thereof and to the vehicle body 112 on another longitudinal end thereof. It is to be noted here that, with only the two engine mounts 116, 117, the power plant 115 may roll about a roll axis (principal axis of inertia) due to the driving torque of the engine 113, but the torque rod 118 prevents the rolling of the power plant 115. Each end of the torque rod 118 is provided with a variable stiffness bushing 1, which may be realized by any of the variable stiffness bushings 1 shown in the foregoing embodiments.

Further, other than the suspension 101 and the engine support where the vibrations are generated in the automobile, the variable stiffness bushing 1 may be used in various portions/places where vibrations may be generated, such as in a motor support. The variable stiffness bushing 1 may be used even in portions of devices other than automobiles where vibrations may be generated.

The present invention has been described in the foregoing with respect to the concrete embodiments thereof, but various modifications and alterations of the present invention are possible without being limited by the foregoing embodiments. For instance, in the foregoing embodiments, the entirety of the outer tubular member 7 constitutes a yoke, but it is only necessary that the yoke is included in the outer tubular member 7 or the inner tubular member 6, and the outer tubular member 7 or the inner tubular member 6 may include a part made of a metal having a low permeability.

Besides, the concrete structure, arrangement, number, angle, material, etc. of the components of the foregoing embodiments may be appropriately changed within the scope of the present invention. Also, not all of the structural elements shown in the above embodiments are necessarily indispensable and they may be selectively adopted as appropriate. The structures of the foregoing embodiments may be combined as appropriate.

The invention claimed is:

1. A variable stiffness bushing, comprising:
   an inner tubular member arranged along an axis;
   an outer tubular member disposed coaxially around the inner tubular member with a prescribed gap defined between the outer tubular member and the inner tubular member;
   a tubular elastic member connecting the inner tubular member and the outer tubular member;
   at least one pair of liquid chambers defined in the elastic member such that the liquid chambers are circumferentially separated from one another and first axial ends and second axial ends of the liquid chambers are defined by a first end wall and a second end wall of the elastic member, respectively;
   at least one communication passage each including a circumferential passage provided in the outer tubular member and extending in a circumferential direction, each of the at least one communication passage communicating the liquid chambers of a corresponding pair of the at least one pair of liquid chambers with each other;
   a magnetic fluid filling the at least one pair of liquid chambers and the at least one communication passage,
   wherein the first end wall and the second end wall are configured such that when the inner tubular member and the outer tubular member are axially displaced relative to each other, a difference is created between volumes of the liquid chambers of each pair of the at least one pair of liquid chambers,
   wherein when a vertical direction is defined as a direction of the axis of the inner tubular member, the outer tubular member includes a cylindrical inner yoke disposed along the axis, a coil coaxially wound around the inner yoke, an outer yoke surrounding the coil, a tubular lower yoke jointed to a lower end of the outer yoke and opposing a lower end of the inner yoke via a gap so that at least one annular gap each constituting the circumferential passage of a corresponding one of the at least one communication passage is formed on an inner side of the coil, and a tubular passage forming member made of a non-magnetic material and positioned between the inner yoke and the elastic member, the tubular passage forming member closing the at least one annular gap such that the circumferential passage of each communication passage is defined between the tubular passage forming member and the coil,
   wherein the tubular passage forming member is formed with at least one pair of communication holes, each pair of the at least one pair of communication holes communicating the circumferential passage of a corresponding one of the at least one communication passage with a corresponding pair of the at least one pair of liquid chambers, and
   wherein when an electric current flowing through the coil generates a magnetic field around the coil, the inner yoke, the outer yoke, and the lower yoke of the outer tubular member jointly form a magnetic circuit.

2. The variable stiffness bushing according to claim 1, wherein a part of the first end wall defining the first axial end of one liquid chamber of each pair of the at least one pair of liquid chambers has a first high bending stiffness portion on a side of the inner tubular member,
   a part of the second end wall defining the second axial end of the one liquid chamber of each pair of the at least one pair of liquid chambers has a second high bending stiffness portion on a side of the outer tubular member, a part of the first end wall defining the first axial end of another liquid chamber of each pair of the at least one pair of liquid chambers has a third high bending stiffness portion on a side of the outer tubular member, and a part of the second end wall defining the second axial end of the other liquid chamber of each pair of the at least one pair of liquid chambers has a fourth high bending stiffness portion on a side of the inner tubular member.

3. The variable stiffness bushing according to claim 2, wherein the first to fourth high bending stiffness portions each include a reinforcement plate provided in the first end wall or the second end wall associated therewith.

4. The variable stiffness bushing according to claim 3, wherein the reinforcement plate of each high bending stiffness portion provided on the side of the one of the inner tubular member and the outer tubular member is at least partially embedded in the first end wall or the second end wall associated therewith and is not in contact with the inner yoke and the lower yoke.

5. The variable stiffness bushing according to claim 3, wherein the reinforcement plate of each high bending stiffness portion provided on the side of the other of the inner tubular member and the outer tubular member is formed integrally with the other of the inner tubular member and the outer tubular member.

6. The variable stiffness bushing according to claim 1, wherein the at least one pair of liquid chambers comprises a first pair of liquid chambers and a second pair of liquid chambers, the liquid chambers of each pair are circumferentially spaced from each other by a predetermined distance so as to oppose each other with the inner tubular member interposed therebetween, and the at least one communication passage includes a first communication passage communicating the liquid chambers of the first pair of liquid chambers with each other and a second communication passage communicating the liquid chambers of the second pair of liquid chambers with each other.

7. The variable stiffness bushing according to claim 6, wherein the circumferential passage of the first communication passage is formed at a position corresponding to one side of the coil with respect to an axial direction, and the circumferential passage of the second communication passage is formed at a position corresponding to another side of the coil with respect to the axial direction.

8. The variable stiffness bushing according to claim 7, wherein the coil is constituted of a first coil and a second coil arranged to be spaced from each other in the axial direction, the circumferential passage of the first communication passage being provided at a position corresponding to the first coil in the axial direction, and the circumferential passage of the second communication passage being provided at a position corresponding to the second coil in the axial direction.

* * * * *